United States Patent
de Graaff et al.

(10) Patent No.: US 10,667,646 B2
(45) Date of Patent: Jun. 2, 2020

(54) APPARATUS FOR PREPARING A COFFEE BEVERAGE, A SYSTEM COMPRISING SUCH AN APPARATUS, USE OF A COFFEE CONTAINER IN SUCH A SYSTEM OR IN SUCH AN APPARATUS AND A METHOD FOR PREPARING A COFFEE BEVERAGE USING SUCH AN APPARATUS OR USING SUCH A SYSTEM

(71) Applicant: Koninklijke Douwe Egberts B.V., Utrecht (NL)

(72) Inventors: Gerbrand Kristiaan de Graaff, Utrecht (NL); Gustaaf Frans Brouwer, Utrecht (NL); Johannes Cornelis Nieuwlaat, Utrecht (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 0 days.

(21) Appl. No.: 15/600,436

(22) Filed: May 19, 2017

(65) Prior Publication Data
US 2017/0367524 A1    Dec. 28, 2017

Related U.S. Application Data

(63) Continuation of application No. PCT/NL2015/050812, filed on Nov. 20, 2015.

(30) Foreign Application Priority Data

Nov. 20, 2014    (NL) .................................. 2013840
Jul. 1, 2015    (NL) .................................. 2015071

(51) Int. Cl.
*A47J 31/44*      (2006.01)
*A47J 31/36*      (2006.01)

(52) U.S. Cl.
CPC ....... *A47J 31/4496* (2013.01); *A47J 31/3676* (2013.01)

(58) Field of Classification Search
CPC ................ A47J 31/3623; A47J 31/3676; A47J 31/4496; A47J 31/46; A47J 31/467
(Continued)

(56) References Cited

U.S. PATENT DOCUMENTS 5,897,899 A    4/1999    Fond
6,988,444 B1 *    1/2006    Pfeifer .................... A47J 31/42
                                                                99/286
(Continued)

FOREIGN PATENT DOCUMENTS

CA            2780698        5/2011
CN      201481108 U        5/2010
(Continued)

OTHER PUBLICATIONS

International Search Report and Written Opinion, PCT/NL2015/050812, Koninklijke Douwe Egberts B.V., 11 pages (dated Apr. 18, 2016).

(Continued)

*Primary Examiner* — Reginald Alexander
(74) *Attorney, Agent, or Firm* — Foley & Lardner LLP

(57) ABSTRACT

An apparatus for preparing a coffee beverage. The apparatus comprises a holder for receiving a coffee container. The holder comprising at least one outlet opening having at least one orifice for generating a coffee beverage flow when coffee beverage is fed to the outlet opening. A liquid flow path extends between the orifice and at least one outflow opening for discharging coffee beverage from the apparatus, a coffee outlet chamber being included in the liquid flow path. The apparatus further comprises an air flow generator for during operation- generating a flow of air in the coffee (Continued)

outlet chamber for entraining in the flow of air an aroma of the coffee beverage; said coffee outlet chamber comprising at least one dispenser opening for dispensing coffee beverage aroma in a direction away from the apparatus, in particular into the direction of the user. The at least one dispenser opening is separate from the at least one outflow opening. A method for preparing coffee beverage comprises the step of generating a flow of air in the coffee outlet chamber.

33 Claims, 18 Drawing Sheets

(58) Field of Classification Search
USPC .............................. 99/295, 280, 302 R, 323.1
See application file for complete search history.

(56) References Cited

U.S. PATENT DOCUMENTS

| | | | |
|---|---|---|---|
| 7,748,311 B2* | 7/2010 | Brouwer | A47J 31/30 99/295 |
| 2003/0079612 A1 | 5/2003 | Con | |
| 2005/0189439 A1 | 9/2005 | Breeden | |
| 2007/0079707 A1* | 4/2007 | Noordhuis | A47J 31/0668 99/275 |
| 2008/0148958 A1 | 6/2008 | Koeling et al. | |
| 2009/0183641 A1 | 7/2009 | Verhoeven et al. | |
| 2010/0011975 A1 | 1/2010 | Mazzer | |
| 2013/0061762 A1* | 3/2013 | Carr | A47J 31/0668 99/295 |
| 2013/0087050 A1 | 4/2013 | Studor et al. | |
| 2013/0115342 A1 | 5/2013 | Van Os et al. | |
| 2015/0135966 A1* | 5/2015 | Hulett | A47J 31/404 99/289 R |
| 2016/0066742 A1* | 3/2016 | de Graaff | A47J 31/44 99/280 |

FOREIGN PATENT DOCUMENTS

| | | |
|---|---|---|
| CN | 103417114 A | 12/2013 |
| DE | 299 12 395 U1 | 9/1999 |
| EP | 0 904 718 | 3/1999 |
| EP | 1 398 279 | 3/2004 |
| GB | 2 469 873 A | 11/2010 |
| JP | 02-190996 A | 7/1990 |
| JP | H02-190996 A | 7/1990 |
| JP | 2010-057799 A | 3/2010 |
| JP | 2012-029861 A | 2/2012 |
| WO | WO-2005/058109 A1 | 6/2005 |
| WO | WO-2006/014936 A2 | 2/2006 |
| WO | WO 2009/110783 | 3/2010 |
| WO | WO 2010/137954 | 12/2010 |
| WO | WO 2014/007639 | 1/2014 |
| WO | WO 2014/063498 | 10/2014 |
| WO | WO-2014/185783 A1 | 11/2014 |

OTHER PUBLICATIONS

Chinese Search Report, App. No. 2015800738583, 2 pages (dated Jan. 28, 2019).

* cited by examiner

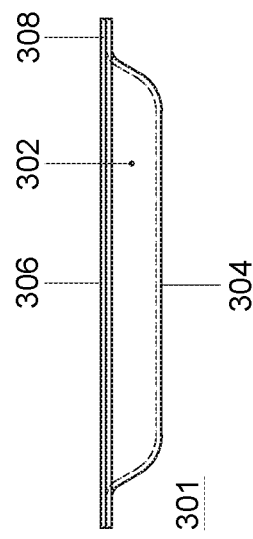
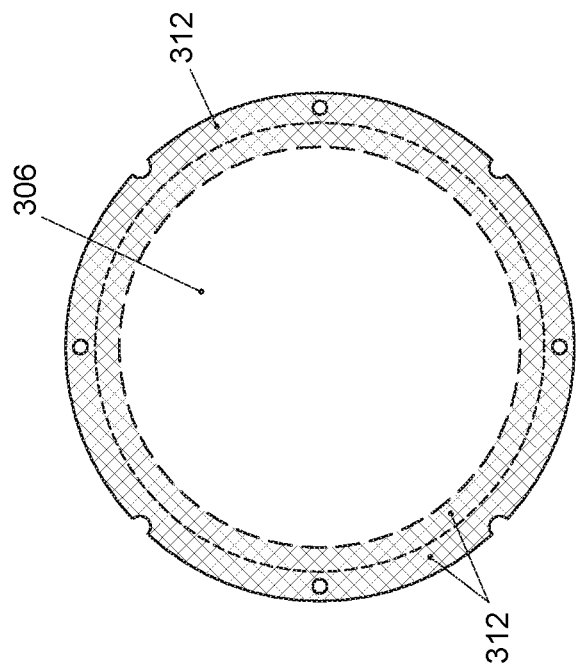
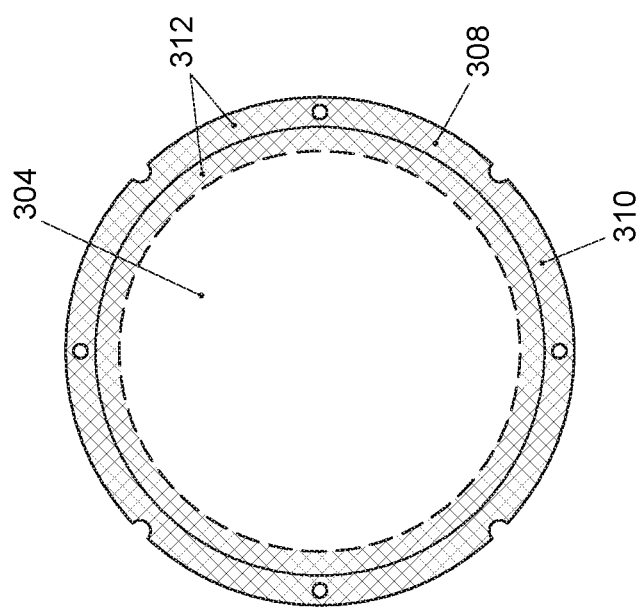

APPARATUS FOR PREPARING A COFFEE BEVERAGE, A SYSTEM COMPRISING SUCH AN APPARATUS, USE OF A COFFEE CONTAINER IN SUCH A SYSTEM OR IN SUCH AN APPARATUS AND A METHOD FOR PREPARING A COFFEE BEVERAGE USING SUCH AN APPARATUS OR USING SUCH A SYSTEM

CROSS-REFERENCE TO RELATED APPLICATIONS

This application is a continuation of PCT/NL2015/050812, filed Nov. 20, 2015, which claims the benefit of and priority to Netherlands Application No. 2013840, filed Nov. 20, 2014, and also to Netherlands Application No. 2015071, filed Jul. 1, 2015, the entire contents of all of which are incorporated herein by reference.

BACKGROUND

The invention relates to an apparatus for preparing a coffee beverage, comprising a housing comprising an interior space, a holder arranged for receiving a coffee container, such as for example a pouch made of filter material and filled with a coffee product to be extracted or a soluble coffee product or a capsule containing a coffee product to be extracted, a soluble coffee product or a liquid coffee or milk product, the holder comprising at least one outlet opening and an access opening for placing the coffee container, such as the pouch or capsule in the holder, the outlet opening being provided with at least one orifice for generating a coffee beverage flow when coffee beverage is fed to the outlet opening; a heating device for heating water; a liquid duct for supplying heated water from the heating device to the coffee container; wherein a liquid flow path extends between the orifice and at least one outflow opening of the apparatus for discharging the coffee beverage from the apparatus, a coffee outlet chamber being included in the liquid flow path, said coffee outlet chamber comprising a coffee beverage passage so that—in use—the coffee beverage flows through the coffee outlet chamber to the at least one outflow opening of the apparatus.

Such an apparatus is for example known from EP-A-0 904 718. In this known apparatus the outflow opening has such a small diameter that the coffee beverage spouts from the outflow opening for obtaining coffee with a small-bubble foam layer (café crème). Although this known apparatus is able to provide a café crème with excellent quality and taste the subjective impression of the user regarding the quality of the machine and the produced product respectively is not only influenced by the mechanical overall impression of the machine and the quality of the product prepared by it but also by the consumer or user experiencing the true aroma of the coffee beverage prepared.

It is therefore an object of the present invention to provide an apparatus for preparing a coffee beverage providing an improved impression of high quality coffee beverages by improving the dispense of coffee beverage aroma from the apparatus.

SUMMARY

In accordance with the invention this object is achieved by providing an apparatus for preparing a coffee beverage, comprising:
a housing comprising an interior space,
a holder arranged for receiving a coffee container, such as for example a pouch made of filter material and filled with a coffee product to be extracted or a soluble coffee product or a capsule containing a coffee product to be extracted, a soluble coffee product or a liquid coffee or milk product, the holder comprising at least one outlet opening and an access opening for placing the coffee container in the holder, the outlet opening being provided with at least one orifice for generating a coffee beverage flow when coffee beverage is fed to the outlet opening;
a heating device for heating water;
a water supplying device comprising a liquid duct for supplying heated water from the heating device to the coffee container;
wherein a liquid flow path extends between the orifice and at least one outflow opening of the apparatus for discharging the coffee beverage from the apparatus, a coffee outlet chamber being included in the liquid flow path, said coffee outlet chamber comprising a coffee beverage passage so that—in use—the coffee beverage flows through the coffee outlet chamber to the at least one outflow opening of the apparatus;
characterized in that the apparatus further comprises an air flow generator for—during operation—generating a flow of air in the coffee outlet chamber for entraining in the flow of air an aroma of the coffee beverage; said coffee outlet chamber comprising at least one dispenser opening for dispensing coffee beverage aroma in a direction away from the apparatus, in particular into the direction of the user, said at least one dispenser opening being separate from the at least one outflow opening of the apparatus. In this manner the flow of air generated in the coffee outlet chamber comes into contact with flowing coffee beverage in the coffee outlet chamber as a result of which aroma is entrained in the air flow in a very efficient manner, which aroma is dispensed via the dispenser opening. Please note that in certain embodiments of the invention the outflow opening and the coffee beverage passage can be formed by one and the same opening.

In an embodiment of an apparatus for preparing a coffee beverage according to the invention, wherein the orifice is arranged for generating a coffee beverage jet, wherein the holder comprises a foam chamber into which the orifice opens for receiving the jet generated by the orifice, said foam chamber having at least one discharging opening for dispensing the coffee beverage into the coffee outlet chamber and a jet impact element included in the foam chamber with a top which is clear of an inner wall of the foam chamber whereby the orifice and the jet impact element are oriented relative to each other such that the jet spouts against at least a part of the top of the jet impact element whereby the beverage, after impact on the jet impact element, leaves the foam chamber via the at least one discharging opening as the coffee beverage, said foam chamber being preferably further provided with at least one air supply opening for supplying air to the foam chamber. This particular embodiment of the invention is based on the insight that as a result of the coffee beverage jet exiting the orifice and impacting the jet impact element a strong vaporization of coffee beverage micro droplets is achieved and thereby formation of coffee beverage aroma is performed very efficiently in the enclosed area of the foam chamber. Due to the strong vaporization there exists an extreme large interaction surface between the fluid within the foam chamber and the flow of air generated in the coffee outlet chamber by the air flow generator which flow of air enters the foam chamber via the at least one air supply opening as a result of which the air dispensed from the dispenser opening contains a surprisingly large amount of aroma which can provide the consumer or user the olfactory experience of high quality café crème which matches the quality of the taste of the café crème itself. The entrainment of aroma in the air flow generated in the foam chamber is far more than when a flow of air would only be in contact with the coffee beverage discharged from the outflow opening. In addition, the temperature in the foam chamber can—during operation—be higher than the temperature of the coffee beverage discharged via the outflow opening, which increased temperature furthermore enhances the aroma entrainment in the air flow through the foam chamber. Consequently the invention also provides an embodiment of an apparatus for preparing a coffee beverage, wherein the at least one orifice is arranged for during use—generating a coffee beverage flow with a large coffee beverage contact surface and wherein the air flow generator is arranged such that—during operation—the flow of air comes into contact with the large coffee beverage contact surface. Alternatively or additionally the coffee outlet chamber is arranged for providing a flow surface with a large area for the coffee beverage. This can in an advantageous manner also be realized in that the coffee outlet chamber comprises protrusions or a relief construction, such as a central pyramid protruding from the bottom of the coffee outlet chamber.

Although it is possible in an embodiment of the invention that the air flow generator directs air from the environment surrounding the apparatus and blows this air into the coffee outlet chamber, such environmental air could give rise to cooling down of the fluid within the coffee outlet chamber and could thus lead to an undesired cooling down of the coffee beverage discharged via the outflow opening. To prevent or at least to reduce such cooling down in a specific embodiment of an apparatus for preparing a coffee beverage according to the invention, in which in the interior space the heating device and the water supplying device, and preferably the liquid duct are positioned, said air flow generator is positioned for—during operation—generating a flow of air within the interior space which contacts heated parts of the apparatus within the interior space. Such heated parts can be formed by the heating device or parts located within the interior space which are heated by the heating device. To prevent an underpressure being created within the interior space the housing preferably is provided with at least one vent opening communicating with the atmosphere surrounding the apparatus. Since the heating device is positioned within the interior space this results therein that the temperature of the air within the interior space is higher than the temperature of environmental air, which leads to a reduced cooling down or no cooling at all of the fluid within the coffee outlet chamber by the air flow generated by the air flow generator.

In an embodiment of an apparatus for preparing a coffee beverage according to the invention the air flow generator can then be positioned for—during operation—directing air from the interior space into the coffee outlet chamber. It has appeared that by directing air into the coffee outlet chamber the air flow dispensed from the at least one dispenser opening and also from the outflow opening can more effectively reach the nose of a consumer or user standing in front of the apparatus.

In a specific embodiment of an apparatus for preparing a coffee beverage according to the invention the air flow generator is arranged, preferably in or near a wall of the coffee outlet chamber, for—during operation—directly directing the flow of air in the coffee outlet chamber. It is then advantageous when the at least one outflow opening for discharging the coffee beverage from the apparatus is provided at an outlet side of the apparatus and wherein the air flow generator is provided at the outlet side of the apparatus. Alternatively the air flow generator is arranged for—during operation—blowing the flow of air into the coffee outlet chamber below the at least one orifice.

In an alternative embodiment of an apparatus for preparing a coffee beverage according to the invention, said coffee outlet chamber is positioned between the interior space and the air flow generator. Although in comparison with the arrangement in which the air flow generator is positioned between the interior space and the coffee outlet chamber the dispense of aroma is somewhat less far reaching, dispense of aroma is however still very appealing for the consumer, and in addition the arrangement of the air flow generator within the apparatus can be realized in an easier manner.

The invention is in particular advantageous when used in an embodiment of an apparatus for preparing a coffee beverage of which the coffee outlet chamber comprises a cup-shaped element open at its top, which top is designed for supporting the holder, said coffee outlet chamber having a circumferential wall and a bottom, wherein preferably said holder and said coffee outlet chamber are arranged such that when the coffee outlet chamber supports the holder the holder closes off the open top of the coffee outlet chamber.

In an advantageous embodiment of an apparatus for preparing a coffee beverage according to the invention the circumferential wall of the coffee outlet chamber comprises a coffee outlet chamber air passage opening arranged for—during operation—communicating with the interior space for passing air from the interior space into the coffee outlet chamber. In this manner air can be directed reproducibly and efficiently from the interior space into the coffee outlet chamber.

In a further embodiment of an apparatus for preparing a coffee beverage according to the invention the said air flow generator is positioned—during operation—near the coffee outlet chamber air passage opening for directly directing air from the interior space into the coffee outlet chamber via the coffee outlet chamber air passage opening, wherein said coffee outlet chamber air passage opening is separate from said at least one dispenser opening and the coffee beverage passage.

In a further embodiment of an apparatus for preparing a coffee beverage according to the invention the apparatus comprises a lid for closing and releasing the access opening, wherein the liquid duct is arranged for supplying heated water from the heating device to the lid, said lid being provided with an inflow opening for supplying heated water from the liquid duct to the coffee container, said lid comprising a lid air passage opening arranged for—during operation—communicating with the interior space for passing air from the interior space into the coffee outlet chamber via the coffee container. The air flow generator, which preferably comprises one or more fans or ventilators, may then be positioned within the lid air passage opening or be positioned within the interior space and be connected to the lid air passage opening by means of a air passage duct for directing air from the interior space via the air passage duct into the coffee outlet chamber. In this manner the air from the interior space passes through the coffee container in which the heated water is supplied for extracting, dissolving or brewing the coffee within the coffee container. During this extraction, solution or brewing aromas are generated which can be entrained within the air flow which leaves the coffee container and passes through the outlet opening of the holder into the coffee outlet chamber where due to the large interaction surface more aroma can be entrained with the air flow, which air flow is finally dispensed from the apparatus by the at least one dispenser opening and the outflow opening. It can then be advantageous when the holder comprises a holder air passage opening arranged for—during operation—communicating with the interior space for passing air from the interior space into the coffee outlet chamber via the coffee container, said holder passage opening being separate from the outlet opening. In this manner the air from the interior space can leave the holder through the holder air passage opening instead of or in addition to the outlet opening, as a result of which the generation of the coffee beverage flow is not or less influenced by the passage of air from the interior space. Preferably the apparatus comprises an air moistener positioned in the interior space, said air moistener being arranged for—during operation—moistening the flow of air, preferably within the interior space. Preferably said air moistener is positioned near the lid air passage opening. In this manner air from the interior space directed into the coffee container is moistened as a result of which the preparation process can be influenced less or not at all. Please note that the number, the opening area and/or the shape of the dispenser openings and/or the pattern in which the dispenser openings are provided can be adapted to provide a desired manner of dispensing coffee beverage aroma.

In a still further embodiment of an apparatus for preparing a coffee beverage according to the invention in which the apparatus comprises an air warming unit positioned in the interior space, said air warming unit being arranged for—during operation—warming air within the interior space. In this manner air from the interior space and directed into the coffee outlet chamber is warmed as a result of which the fluid within the coffee outlet chamber can be prevented from cooling down. Warming up of air can be performed effectively when said air warming unit is positioned near an air passage opening.

Cooling down of the fluid within the coffee outlet chamber can be prevented while still obtaining a desired level of dispensing aroma when the air warming unit is arranged for—during operation warming up air with a temperature value in a range between 20° C. and 140° C., preferably between 20° C. and 80° C.

In a further embodiment of an apparatus for preparing a coffee beverage according to the invention the air flow generator is arranged for—during operation—generating a flow of air with a flow in a range between 41/min and 20 1/min, preferably between 5 1/min and 101/min. In this manner aroma can be dispensed over a sufficiently large area surrounding the apparatus.

In a further embodiment of an apparatus for preparing a coffee beverage according to the invention the apparatus comprises a control unit for controlling the functioning of the apparatus, said control unit being operatively connected to a user operated heating up button and operatively connected to the heating device for activating the heating device after a user has activated the user operated heating up button, said control unit being operatively connected to said air flow generator for controlling the air flow generator. Preferably said control unit is operatively connected to a user operated aroma dispensing button for controlling the air flow generator after a user has activated the user operated aroma dispensing button. In this manner a user can choose to activate the dispense of aroma at his or her command by activating the user operated aroma dispensing button.

The configuration of an embodiment of an apparatus for preparing a coffee beverage according to the invention can be simplified when the user operated aroma dispensing button is formed by the user operated heating up button.

In order to prevent the air within the coffee outlet chamber from cooling down the control unit is preferably arranged for activating the air flow generator a predetermined time period, for example a time period of at least 10 seconds, after the user operated heating up button has been activated.

In an advantageous alternative embodiment of an apparatus for preparing a coffee beverage according to the invention the control unit is operatively connected to a user operated brewing button and operatively connected to the water supplying device for supplying water via the liquid duct after a user has activated the user operated brewing button, wherein the user operated aroma dispensing button is formed by the user operated brewing button. The control unit can then be arranged for activating the air flow generator after the user operated brewing button has been activated, preferably a predetermined time period, for example a time period of at least 3 seconds, after the user operated brewing button has been activated.

In a further embodiment of an apparatus according to the invention the orifice is integral with the holder. Preferably the foam chamber extends into the coffee outlet chamber.

In an advantageous embodiment of an apparatus for preparing a coffee beverage according to the invention the coffee container is provided with means comprising readable id-information, said apparatus comprising a reader for reading the readable id-information on the coffee container, said reader being operatively connected to the control unit for providing a reading signal to the control unit, said reading signal being indicative for the read id-information, said control unit automatically controlling the air flow generator in dependence of the reading signal received from the reader. Please note that such id-information can comprise a number of data relevant for the coffee apparatus, such as for example id-information comprising one or any combination of the following information: unique identifier, type of container, date of production, batch number, type of ingredient included in the container, name of manufacturer, serial number. Preferably the means comprising readable first id-information are formed by at least one of the following: optically readable symbols, such as a barcode or a color code or a taggant; magnetically responsive surfaces; embossed surfaces; electrically-responsive surfaces, such as an electrically conductive surface or structure; an integrated circuit, such as an RFID or NFC-chip. In this manner the air flow generator can be controlled, such as activated, not-activated or deactivated in dependence of the read id-information, which provides the possibility to e.g. activate or deactivate the air flow generator in dependence on e.g. the kind of coffee product in the coffee container or the manufacturer of the coffee container.

In an embodiment of an apparatus for preparing a coffee beverage according to the invention the control unit is then arranged for automatically controlling the air flow generator in one of the following manners: activating the air flow generator, de-activating the air flow generator, not-activating the air flow generator and activating the air flow generator such as to generate a flow with an amount in dependence of the reading signal received from the reader.

In a still further embodiment of an apparatus for preparing a coffee beverage according to the invention the at least one dispenser opening is arranged for—during operation—dispensing coffee beverage aroma in a zone extending over an angle of at least 45°, preferably approximately 90° so that the dispensed aroma can in practically all instances reach the consumer operating the apparatus. Preferably the at least one dispenser opening is arranged at a height of between 0.70 m and 1.20 m, preferably 1.05 m above a horizontal floor and is further arranged for—during operation—dispensing coffee beverage aroma such that the aroma reaches a height of between 1.1 m and 1.85 m, preferably 1.5 m above the horizontal floor at a horizontal distance of between 0.3 m and 1.2 m, preferably 0.8 m from the at least one dispenser opening. In this manner the aroma can effectively reach the nose of a consumer standing in front of the apparatus.

In a further embodiment of an apparatus for preparing a coffee beverage according to the invention the air flow generator and the at least one dispenser opening are arranged for providing a flow of air from the at least one dispenser opening having a velocity in a range between 1.0 m/s and 10.0 m/s, preferably between 1.5 m/s and 6.0 m/s, more preferred about 2.0 m/s. In this manner aroma can be dispensed over a sufficiently large area surrounding the apparatus without reducing the intensity of the aroma by air dilution.

In a further embodiment of an apparatus for preparing a coffee beverage according to the invention the at least one outflow opening for discharging coffee beverage is formed by the free end of an outlet duct of the coffee outlet chamber having a bottom part over which—during operation—coffee beverage flows and a top part opposite the bottom part, said at least one dispenser opening being positioned in the top part. Although it might be possible in an embodiment of the apparatus according to the invention that one of the dispenser openings is formed by the outflow opening or the free end of the outlet duct dispensing aroma can be optimally realized by providing at least one separate dispenser opening preferably positioned in the top part of the outlet duct. By using a top part which is detachably connected to the bottom part it is possible to exchange top parts and to use top parts having a different number of dispenser openings and/or having dispenser openings with a different opening area, shape or having a different pattern in which the dispenser openings are provided. In addition the number, the opening area and/or the shape of the dispenser openings and/or the pattern in which the dispenser openings are provided can be adapted to the specific outlet duct that is being used. In particular when the top part comprises a single circular dispenser opening provided on a central longitudinal axis of the top part or two circular dispenser openings provided either spaced from each other on the central longitudinal axis of the top part or symmetrically on both sides of the central longitudinal axis of the top part or a single central rectangular slot extending substantially transverse to the central longitudinal axis of the top part it appears that aroma can be dispensed satisfactorily.

In a particularly advantageous embodiment of an apparatus for preparing a coffee beverage according to the invention the at least one dispenser opening is a slot having a height of between 1 mm and 2 mm, preferably 1.5 mm, an end angle of between 30° and 60°, preferably 45°, a radius of curvature of between 10 mm and 30 mm, preferably 20 mm, an elevation angle of between 5° and 15°, preferably 10° with respect to a horizontal plane, an air flow surface area of between 10 mm$^2$ and 60 mm$^2$, preferably 30 mm$^2$, and an offset from the top part of between 1 mm and 3 mm, preferably 2 mm.

In an alternative embodiment of an apparatus for preparing a coffee beverage according to the invention the at least one dispenser opening is a circular or oval hole having a diameter in a range between 2 mm and 14 mm, preferably between 5 mm and 10 mm.

In an alternative embodiment of an apparatus for preparing a coffee beverage according to the invention the at least one dispenser opening is provided in the circumferential wall of the coffee outlet chamber. Said at least one dispenser opening is separate from the coffee outlet chamber air passage opening and the apparatus further comprises an aroma passage channel—during operation—communicating with the at least one dispenser opening for passing aroma from the coffee outlet chamber in a direction away from the apparatus. For maximum efficiency, in an embodiment of an apparatus for preparing a coffee beverage the aroma passage channel has an inlet port and an outlet port, the surface area of the inlet port and outlet port being equal to each other. It is then preferred when the aroma passage channel slopes downwardly with an angle of 10-15° with respect to a horizontal plane. In this manner the aroma can effectively reach the head of a user. A compact construction of the apparatus can be obtained in an embodiment of an apparatus for preparing a coffee beverage according to the invention in which the aroma passage channel extends through the housing to above the at least one outflow opening of the apparatus.

In a preferred embodiment the apparatus the housing comprises a housing air passage opening which—during operation—lies adjacent and preferably in line with the coffee outlet chamber air passage opening so that air can pass both through the coffee outlet chamber air passage opening and the housing air passage opening. The air flow generator, which preferably comprises one or more fans or ventilators, may then be positioned within the housing air passage opening or be positioned within the interior space and be connected to the housing air passage opening by means of an air passage duct for directing air from the interior space via the air passage duct to the coffee outlet chamber. In an advantageous embodiment of an apparatus for preparing a coffee beverage according to the invention the lid for closing and releasing the access opening forms part of the housing. Preferably the coffee outlet chamber is detachably connected to the housing.

The invention further relates to a system comprising an apparatus for preparing a coffee beverage according to the invention and at least one coffee container, wherein said at least one coffee container is configured to be placed in the holder via the access opening.

Preferably said at least one coffee container comprises a first coffee container provided with means comprising readable first id-information, wherein the reader is arranged for providing a first reading signal to the control unit, said first reading signal being indicative for the read first id-information, said control unit automatically activating the air flow generator in reaction to the first reading signal received from the reader. In an advantageous embodiment of a system according to the invention said at least one coffee container then further comprises a second coffee container either provided with means comprising readable second id-information or free of means comprising readable id-information, wherein the reader is arranged for providing a second reading signal to the control unit, said second reading signal being either indicative for the read second id-information or indicative for a second coffee container free of means comprising readable id-information, said control unit automatically deactivating or not activating the air flow generator in dependence of the second reading signal received from the reader. In this manner aroma is actively dispensed only when the first coffee container is used, and not when the second coffee container is used in the system.

In an embodiment of a system according to the invention the at least one coffee container is a pouch (soft pad) as covered in EP-A-0 904 718.

In a particularly advantageous embodiment of a system according to the invention the at least one coffee container is a form-retaining pad according to EP-A-1,398,279, said form-retaining pad preferably being provided with at least a first covering, in which a product to be extracted, such as ground coffee, with a fluid substance and/or, product soluble in a fluid, such as coffee powder, milk powder/creamer, sugar and similar additives, is included, wherein the covering comprises a top sheet, manufactured from a material non-transmissive to the extractable and/or soluble substance, such as a layer of filter material, and a bottom sheet, manufactured from a material non-transmissive to the extractable and/or soluble substance, but transmissive to the substance dissolved in a liquid or the extracted liquid, such as a layer of filter material, and wherein the pad is further provided with a form-providing stiffening body, which is placed between the top sheet and the bottom sheet, wherein the top sheet and the bottom sheet extend at least partly substantially parallel to each other and to a surface, wherein the stiffening body has a top side adjacent to the top sheet and a bottom side adjacent to the bottom sheet and, by providing a compartmenting wall configuration therein, has a grid structure which is transmissive to liquid from the top side to the bottom side, in which structure at least a part of the extractable and/or soluble substance is accommodated and each compartment formed by the wall configuration is surrounded by that wall configuration, the top sheet and the bottom sheet.

In an alternative system according to the invention the at least one coffee container is a pad according to WO-A-2014/007639, said pad preferably being provided with an envelope with an inner space which is filled with a beverage preparation product for preparing the beverage, wherein the beverage preparation product comprises a product to be extracted with a fluid and/or a product soluble in a fluid, wherein the envelope is formed by a first disc-shaped sheet and a second disc-shaped sheet which are interconnected adjacent their longitudinal edges, wherein the interconnected parts of the first sheet and the second sheet form a sealing seam and wherein the first sheet and the second sheet each form a filter which can pass a fluid and which forms a barrier to the beverage preparation product, wherein, in use, with the coffee-maker a fluid such as water is supplied, under pressure, to the pad so that the fluid is pressed through the pad for obtaining the beverage which thereupon leaves the pad, wherein the second sheet is of form-retaining design.

In a further alternative system according to the invention the at least one coffee container is a pad according to WO-A-2014/163498, said pad preferably being adapted to receive an aqueous fluid that is supplied under pressure to the pad so that the fluid is forced through the pad for obtaining the coffee beverage, wherein the pad includes a covering defining an interior space that is filled with a beverage preparation product for preparing the beverage wherein the beverage preparation product includes a product including ground coffee extractable with an aqueous fluid, wherein the covering comprises a flexible first sheet and a rigid shell, wherein the first sheet and the shell are connected to each other around their perimeter edges, wherein the shell is equipped with at least one outlet opening, wherein the pad is further equipped with a second sheet that is positioned on a bottom of the shell, wherein the second sheet is located between the beverage preparation product and the shell and wherein the first sheet and the second sheet each form a filter that allows an aqueous fluid, including water, and the beverage to pass and that forms a barrier for the beverage preparation product so that, when in use an aqueous fluid under pressure is supplied to the first sheet of the pad the fluid flows through the first sheet to the beverage preparation product so that the beverage is formed which beverage then flows through the second sheet and via the at least one outlet opening leaves the pad, and wherein the at least one outlet opening includes a flow restriction for the beverage.

In a still further alternative system according to the invention the at least one coffee container is a sealed cartridge according to U.S. Pat. No. 5,897,899, said sealed cartridge preferably for preparation of a beverage by extraction of the substance under pressure comprising a cup and a cup cover sealed to the cup and roast and ground coffee substance contained by the cover within the cup, there being no marks in the cover for weakening the cover and there being no filter member contained within the cup and cover, and wherein the cup comprises a base, a sidewall which extends from the base to an edge about a cup opening which opposes the base and a lip which extends laterally away from the sidewall edge and the opening; the cover extending across the opening to the lip and is sealed to the lip so that the roast and ground coffee substance is contained within the cup by the cover; the cup and cover are substantially impermeable to oxygen; and the thicknesses of each of the cup base, sidewall and lip being greater than the thickness of the cover, and the cover has a thickness and a breaking stress so that upon placement of the sealed cartridge in the apparatus the sealed cartridge is positioned in the holder and the cover is adjacent projections of the apparatus for forming a plurality of openings in the cover which allow flow of coffee beverage extracted from the roast and ground coffee substance through the cover and which restrict roast and ground coffee substance escape from within the cartridge via the openings, and upon injection of water under pressure within the cartridge and into the roast and ground coffee substance positioned in the holder so that pressure within the cartridge increases to within a range of from 2 bar to 20 bar, the cover initially deforms and portions of the cover contact and press against the projections and the water wets and compacts the roast and ground coffee substance and then, subsequently, at a pressure within the range of from 2 bar to 20 bar, the cover portions pressed against the projections reach their breaking stress, break and form the plurality of openings for coffee beverage flow and for restricting the roast and ground coffee substance escape through the cover via the openings.

In a still further alternative system according to the invention the at least one coffee container is a capsule according to WO-A-2009/110783, said capsule preferably comprising a circumferential wall, a bottom closing the circumferential wall at a first end, and a lid closing the circumferential wall at a second end opposite the bottom, wherein the wall, bottom and lid enclose an inner space comprising an extractable coffee product, wherein the bottom comprises an entrance area arranged for supplying there through a fluid under pressure to the extractable coffee product for preparing the coffee beverage, wherein the lid comprises an exit area for draining there through the prepared beverage from the capsule, and wherein the entrance area of the capsule comprises an entrance filter for supplying the fluid to the extractable product there through.

In an even further alternative system according to the invention the at least one coffee container is a capsule according to WO-A-2010/137954, said capsule preferably comprising a cup comprising a circumferential wall, a bottom closing the circumferential wall at a first end, and a flange-like rim extending outwardly of the circumferential wall at a second end opposite the bottom, and a lid in use connected to the flange-like rim, wherein the wall, bottom and lid, in use, enclose an inner space comprising an extractable coffee product, and wherein the cup further comprises a plurality of substantially concentric circumferential ridges extending outwardly of the cup, wherein the ridges are made of the same material as the cup.

In an alternative system according to the invention the at least one coffee container is a flexible, disc-shaped/flat type pad according to US-A-2008/0148958, said pad preferably being filled with a product to be extracted such as ground coffee and/or a product to be dissolved such as a creamer, provided with a flexible bottom sheet manufactured from, for instance, filtering paper and a flexible top sheet manufactured from, for instance, filtering paper, the top sheet and the bottom sheet being interconnected at their longitudinal edges so that a covering with a circumferential sealing seam is formed, with the product situated between the top sheet and the bottom sheet, the bottom sheet and the top sheet each forming a filter which is at least virtually impermeable to the product and which is at least permeable to water, while an area of the covering is designed to be at least virtually impermeable to water, the area comprising, preferably, at least one annular sub-area covering at least a part of the sealing seam, and that the area extends outside the sealing seam at predetermined positions.

In a particularly advantageous embodiment of a system according to the invention the means comprising readable first id-information are formed by at least one of the following: optically readable symbols, such as a barcode or a color code or a taggant; magnetically responsive surfaces; embossed surfaces; electrically-responsive surfaces, such as an electrically conductive surface or structure; an integrated circuit, such as an RFID or NFC-chip. Preferably the id-information comprises information related to the container, said id-information comprising one or any combination of the following information: unique identifier, type of container, date of production, batch number, type of ingredient included in the container, name of manufacturer, serial number.

The invention further relates to the use of a coffee container in a system according to the invention or in an apparatus according to the invention, wherein said coffee container is provided with means comprising readable id-information, wherein the reader of the apparatus is arranged for providing a reading signal to the control unit when the coffee container is placed in the holder of the apparatus, said reading signal being indicative for the read first id-information, the control unit of the apparatus automatically activating the air flow generator of the apparatus in reaction to the reading signal received from the reader.

The invention further relates to a method for preparing a coffee beverage using an apparatus for preparing a coffee beverage according to the invention or a system according to the invention, comprising the steps of:
  positioning a coffee container in the holder;
  heating water by the heating device;
  supplying heated water to the coffee container; and
  discharging coffee beverage from the orifice of the holder into the coffee outlet chamber;
  generating a flow of air in the coffee outlet chamber for entraining in the flow of air an aroma of the coffee beverage; and
  dispensing coffee beverage aroma in a direction away from the apparatus, in particular into the direction of the user.

In an advantageous embodiment of a method for preparing a coffee beverage according to the invention the method comprises the step of generating a coffee beverage jet by the orifice, providing the holder with a foam chamber into which the orifice opens for receiving the jet generated by the orifice, said foam chamber having at least one discharging opening for dispensing the coffee beverage into the coffee outlet chamber and a jet impact element included in the foam chamber with a top which is clear of an inner wall of the foam chamber whereby the orifice and the jet impact element are oriented relative to each other such that the jet spouts against at least a part of the top of the jet impact element whereby the beverage, after impact on the jet impact element, leaves the foam chamber via the at least one discharging opening as the coffee beverage, said foam chamber being further provided with at least one air supply opening for supplying air to the foam chamber.

Preferably the step of generating a flow of air comprises the step of generating a flow of air within an interior space of a housing of the apparatus, in which housing the heating device and the water supplying device are positioned, and the step of heating the flow of air within the interior space, preferably warming up air with a temperature value in a range between 20° C. and 140° C., preferably between 20° C. and 80° C.

In an advantageous embodiment of a method for preparing a coffee beverage according to the invention the step of generating a flow of air comprises the step of directing air from the interior space into the coffee outlet chamber.

In a further embodiment of a method for preparing a coffee beverage according to the invention the step of generating a flow of air comprises the step of passing air into the coffee outlet chamber via the coffee container. It is then advantageous when the method comprises the step of moistening the flow of air, preferably within an interior space of a housing of the apparatus, in which housing the heating device and the water supplying device are positioned.

In a still further embodiment of a method for preparing a coffee beverage according to the invention the flow of air is generated with a flow in a range between 4 l/min and 20 l/min, preferably between 5 l/min and 10 l/min.

In an embodiment of a method for preparing a coffee beverage according to the invention, wherein an apparatus with an outlet duct having a bottom part and a top part opposite the bottom part is used, in which top part the at least one dispenser opening is positioned, the step of dispensing coffee beverage aroma in a direction away from the apparatus, in particular into the direction of the user, is performed through the at least one dispenser opening positioned in the top part of the outlet duct of the coffee outlet chamber.

In an alternative embodiment of a method for preparing a coffee beverage according to the invention the step of dispensing coffee beverage aroma in a direction away from the apparatus, in particular into the direction of the user, is performed through the at least one dispenser opening positioned in the circumferential wall of the coffee outlet chamber and the aroma passage channel.

In a still further embodiment of a method for preparing a coffee beverage according to the invention the method is performed by an apparatus comprising a control unit, wherein the method comprises the step of controlling the air flow generator by the control unit. Preferably the air flow generator is controlled after a user has activated a user operated aroma dispensing button. Preferably the air flow generator is activated a predetermined time period after a user operated heating up button has been activated.

In an alternative embodiment of a method for preparing a coffee beverage according to the invention the method comprises the step of activating the air flow generator when the user operated brewing button has been activated, preferably a predetermined time period after the user operated brewing button has been activated.

In an advantageous embodiment of a method for preparing a coffee beverage according to the invention a coffee container is used provided with means comprising readable id-information, and an apparatus is used comprising a reader for reading the readable id-information on the coffee container, wherein the method comprises the steps of reading the means comprising readable id-information of the coffee container by the reader, providing a reading signal indicative for the read id-information to the control unit, and the step of said control unit automatically controlling the air flow generator in dependence of the reading signal received from the reader. Preferably, the control unit is then arranged for automatically controlling the air flow generator in one of the following manners: activating the air flow generator, de-activating the air flow generator, not-activating the air flow generator and activating the air flow generator such as to generate a flow with an amount in dependence of the reading signal received from the reader.

The dispensed aroma can in practically all instances reach the nose of the consumer operating the apparatus in an embodiment of a method according to the invention in which the beverage aroma is dispensed in a zone extending over an angle of at least 45°, preferably approximately 90° and additionally or alternatively when the step of dispensing coffee beverage aroma in a direction away from the apparatus.

In a further embodiment of a method for preparing a coffee beverage according to the invention the method comprises the steps of arranging the at least one dispenser opening at a height of between 0.70 m and 1.20 m, preferably 1.05 m above a horizontal floor and the step of dispensing coffee beverage aroma such that the aroma reaches a height of between 1.1 m and 1.85 m, preferably 1.5 m above the horizontal floor at a horizontal distance of between 0.3 m and 1.2 m, preferably 0.8 m from the at least one dispenser opening. Preferably, the method comprises the step of generating an air flow of 15 l/min. It is then preferred that the method comprises the step of providing a flow of air from the at least one dispenser opening having a velocity in a range between 1.0 m/s and 10.0 m/s, preferably between 1.5 m/s and 6.0 m/s, more preferred about 2.0 m/s.

According to an advantageous embodiment of a method for preparing a coffee beverage according to the invention during operation the apparatus is arranged such that—during use—the flow of air comes into contact with the coffee beverage flow, preferably wherein the at least one orifice generates a coffee beverage flow with a large coffee beverage contact surface and the method comprises the step of letting the flow of air come into contact with the large coffee beverage contact surface.

BRIEF DESCRIPTION OF THE DRAWINGS

Further advantageous aspects of the invention will become clear from the appended description and in reference to the accompanying drawings, in which:

FIGS. 13 to 20 show several embodiments of coffee containers suitable for use in the apparatus, system or method according to the invention;

DETAILED DESCRIPTION

Figure 1:
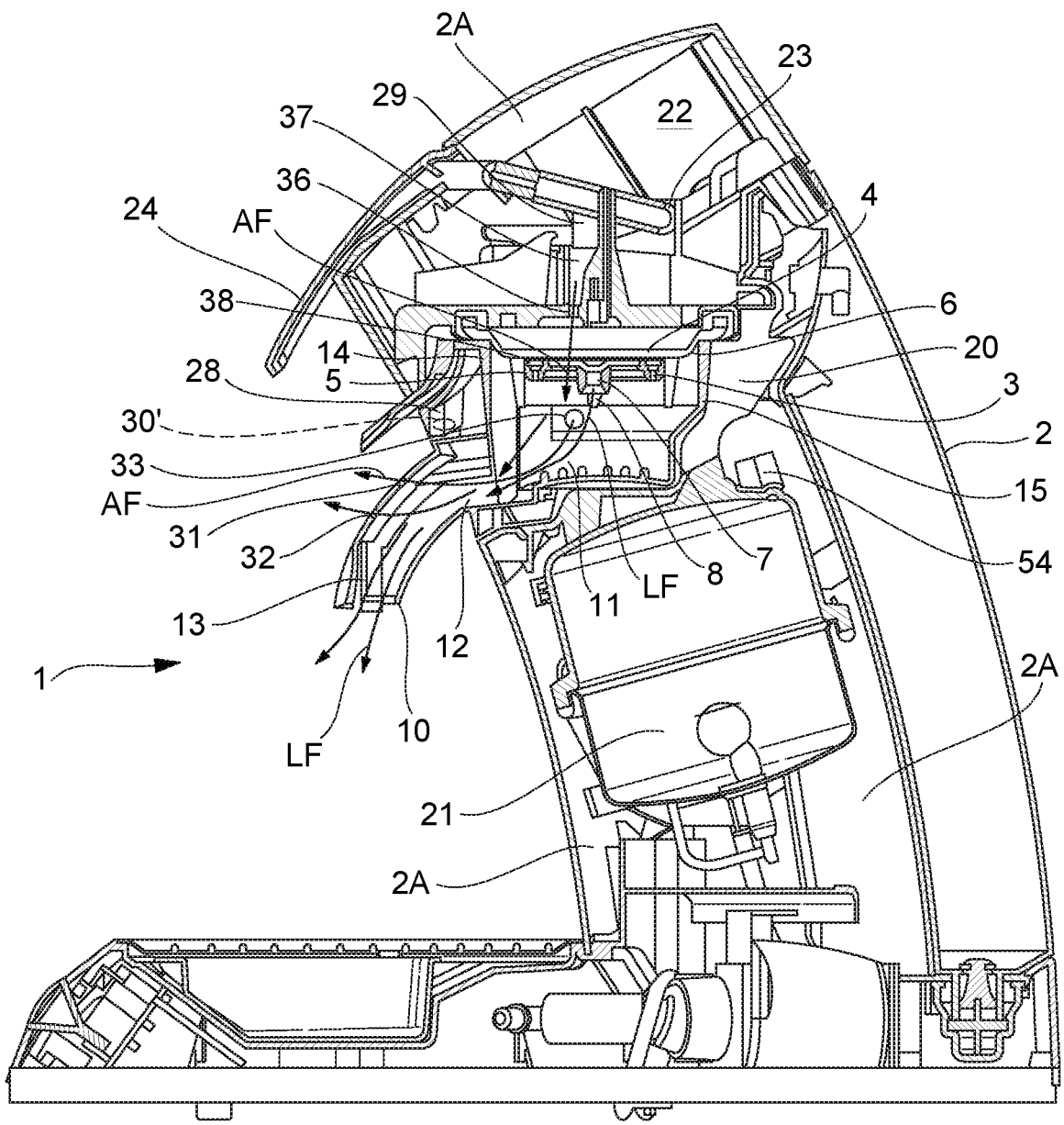
FIG. 1 is a cross section of a first embodiment of an apparatus according to the invention, with a holder closed by a lid.
Figure 2:
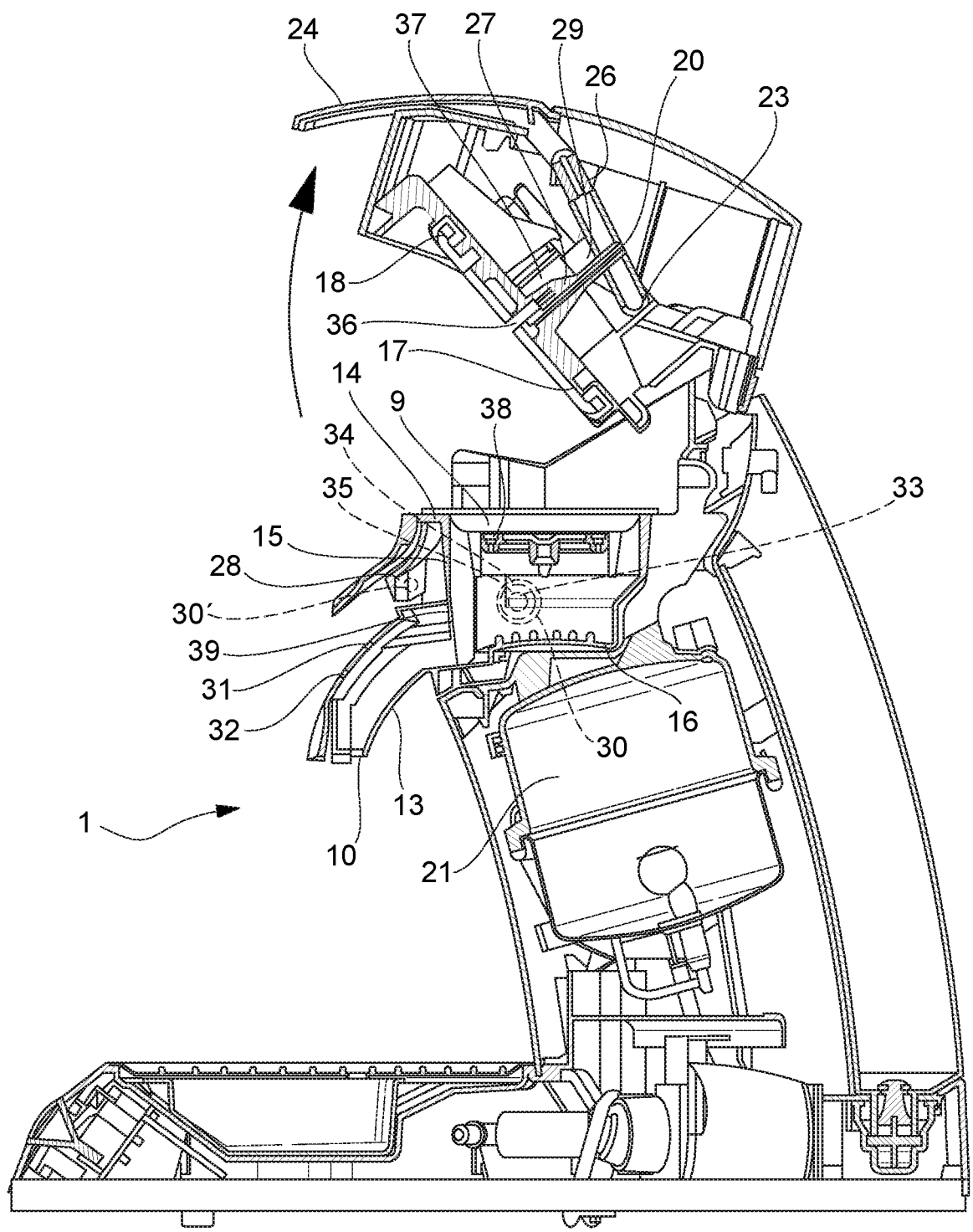
FIG. 2 is a cross section of the apparatus according to FIG. 1 in a position in which lid is opened.

As schematically shown in the exemplary embodiment of an apparatus 1 for preparing a coffee beverage, in this embodiment a coffee beverage having a small-bubbled foam layer, according to the invention as shown in FIGS. 1 and 2 the apparatus 1 comprises a housing 2 which comprises a holder 3 detachably connected to and—in the shown embodiment—within the housing 2. The housing 2 comprises an interior space 2A. The holder 3 is arranged for receiving a coffee container, in the shown embodiment configured as a pouch 4 made of filter material and filled with a product to be extracted, such as ground coffee, or soluble coffee product, such as instant coffee. Please note that in other embodiments the coffee container can be in the form of a capsule, a form-retaining pad, cartridge or similar coffee container as will be described below.

In this example the holder 3 is of cup-shaped design and comprises a bottom 5 and an upright, circumferential sidewall 6, connected to the bottom. Provided in the bottom 5 is a recess 7 provided with at least one outlet opening in this embodiment having one orifice 8 for generating a coffee beverage flow. At its upper end, the holder is provided with an access opening 9 (FIG. 2) for placing the pouch 4 in the holder 3.

The apparatus 1 further comprises a liquid flow path indicated by the arrow LF extending between the orifice 8 and an outflow opening of the apparatus 10 for discharging coffee beverage in which liquid flow path LF a coffee outlet chamber 11 is included. In the shown embodiment the orifice 8 is integral with the holder 3 and extends into the coffee outlet chamber for spouting—during operation—the coffee beverage flow into a liquid surface of coffee beverage already received in the coffee outlet chamber 11 for creating a small-bubble foam layer in the coffee beverage received in the coffee outlet chamber 11. In the shown embodiment the coffee outlet chamber 11 comprises an opening 12, also called the coffee beverage passage communicating with the outflow opening 10 by means of a outlet duct 13 which is connected to the coffee outlet chamber 11 so that—in use—the coffee beverage flows through the coffee outlet chamber to the outflow opening.

The coffee outlet chamber 11 is in the shown embodiment a cup-shaped element which is open at its top 14 (FIG. 2), which top 14 is so designed that the holder 3 can be detachably placed on it. The coffee outlet chamber 11 further has a circumferential wall 15 and a bottom 16.

Figure 4:
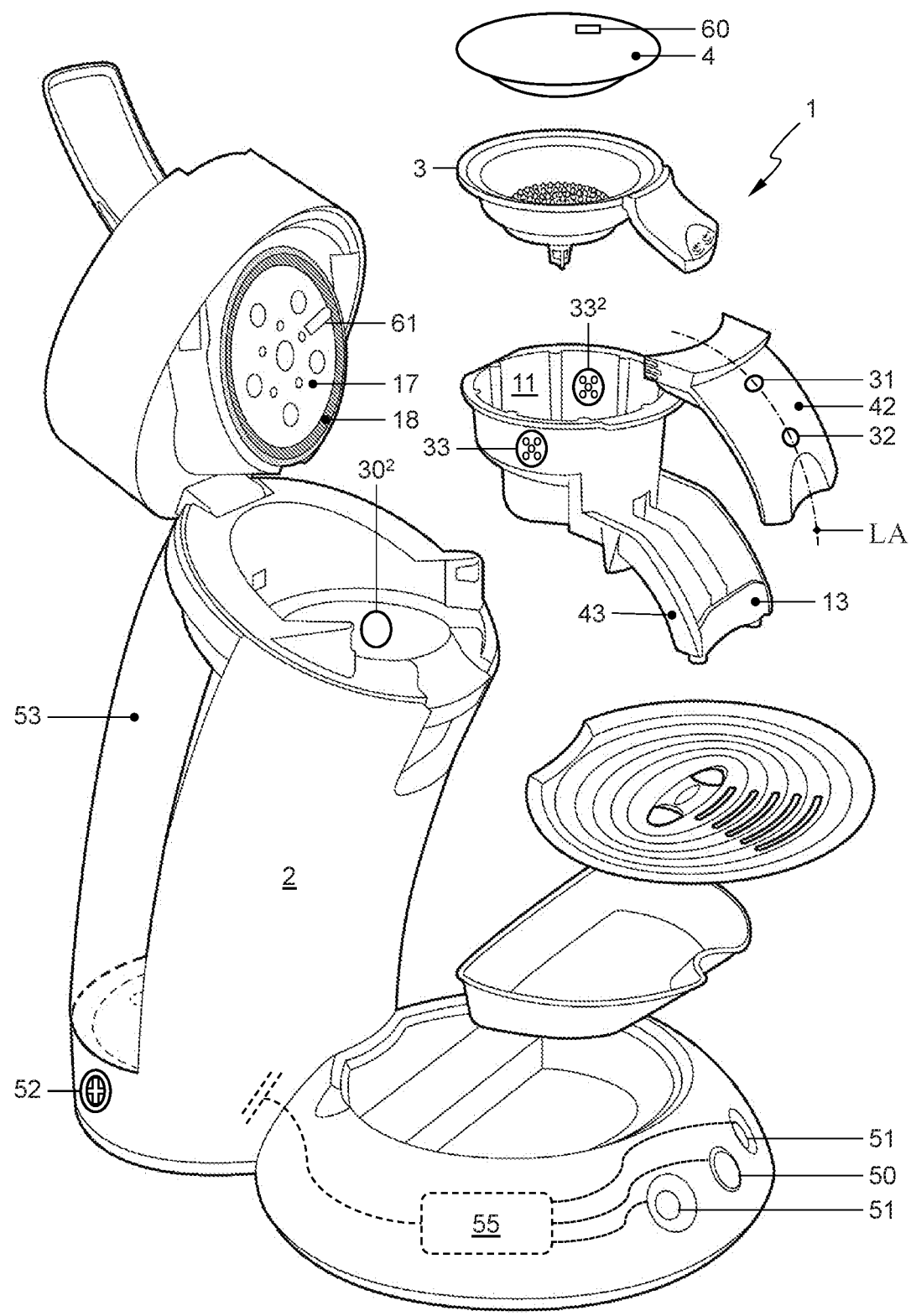
FIG. 4 is a schematic representation in perspective and exploded view of an apparatus according to the invention.

The apparatus 1 further comprises a lid 17 (FIG. 2) for closing and releasing the access opening 9 of the holder 3, which lid 17 in this embodiment forms part of the housing 2. At its underside, the lid 17 is fitted with a sealing ring 18 which, in use, can cooperate with the holder 3. At its top, the lid 17 is provided with an inflow opening 19 which, via a liquid duct 20, is connected to a device 21 for heating water, which water can be present in a water reservoir 53 which is detachably mounted to the housing (FIG. 4). A water supplying device 54 (FIG. 1), such as a pump, is provided in the apparatus for supplying heated water via the liquid duct 20. The device 21 is of a type known per se, such as, for instance, a hot-water boiler, so that a further explanation on this point can be dispensed with. The heating device 21 is arranged for supplying—during operation—heated water via the duct 21 to the inflow opening 19 of the lid 17 and into the pouch 4. The heating device 21 and the liquid duct 20 are positioned within the interior space 2A.

The lid 17 is movably connected to an element 22, preferably and as shown in FIGS. 1 and 2, rotationally mounted to the element 22 about a hinge 23. By rotation around the hinge 23 the lid 17 can be rotated upwards so that the access opening 9 of the holder 3 is cleared or released (see FIG. 2). When, by contrast, the lid 17 is rotated downwards, the holder 3 can be closed off, that is, the access opening 9 is closed off by the lid 17 (see FIG. 1).

The apparatus 1 further comprises a closing arrangement 24 for detachably placing the rotation element 22 in a position in which the lid 17 closes off the holder 3. The closing arrangement 24 comprises clamping means which in the shown embodiment include spring means 25 (FIG. 2) which in the closed position of the lid 17 exert a force on the lid 17 which is transferred by the seal 18 onto the holder 3 and ascertain a correct sealing of the pouch 4 between the lid 17 and the holder 3. In the shown embodiment optional clamping means 26, 27 are provided for pressing the holder 3 and the lid 17 towards each other when the lid closes off the access opening 9 of the holder 3. In addition the coffee outlet chamber 11, in particular the open top end thereof and the holder 3 are configured such that when the coffee outlet chamber supports the holder 3 the holder closes off the open top of the coffee outlet chamber, preferably such that when the lid 17 is positioned in the closed position the holder closes off the open top of the coffee outlet chamber in a substantially hermetical manner for preventing any air leakage.

For clarity sake the operation of the apparatus 1 will be shortly discussed in the following. First, the closing arrangement 24 is operated, so that the lid 17 can be lifted off the holder 3 by rotation of the rotation element 22 about the hinge 23. The resultant situation is shown in FIG. 2. Then the pouch 4 is placed in the holder 3. To that end, the holder 3 can be removed from the housing 2, where after the holder 3, together with the pouch 4, is re-placed in the housing 2. Then the lid 17 can be closed by moving the lid 17 downwards by opposite rotation about the hinge 23. After closing the closing arrangement 24 the spring means 25 and the additional clamping means 26, 27 will press upon the lid 17 and deform the sealing ring 18 to realize an optimum and reliable seal between lid 17 and holder 3.

In the closed position, as shown in FIG. 1, hot water can subsequently be supplied to the duct 20. This hot water is supplied via the lid 17 to the top of the pouch 4. This hot water passes through the pouch 4 and proceeds to collect as coffee beverage in the recess 7. Then the coffee beverage spouts through the orifice 8 into the coffee outlet chamber 11. The coffee outlet chamber 11 is thus filled with coffee beverage. As the coffee beverage spouts into the surface of the liquid in the coffee outlet chamber 11, a good café crème is formed. This café crème flows via the opening 12 out of the coffee outlet chamber 11 into the outlet duct 13 to leave the apparatus 1 via the outflow opening 10.

In addition, the coffee outlet chamber 11 is detachably connected to the housing 2. To remove the coffee outlet chamber 11 from the housing 2, the outlet duct 13 (in the situation shown in FIG. 2) is moved downwards as a result of which the back of the coffee outlet chamber 11 is tilted upwards. In the embodiment of the apparatus 1 shown in FIGS. 1 and 2 the apparatus comprises a holding bridge 28 which aids in this tilting. When the coffee outlet chamber 11 is sufficiently tilted upwards it can be taking from the housing. To place the coffee outlet chamber 11 back into the housing the above mentioned steps are performed in the opposite order.

According to the invention the apparatus further comprises an air flow generator 29, 30, $30^2$, 30' for—during operation—generating a flow of air indicated by the arrow AF in FIG. 1 in the coffee outlet chamber 11 so that the flow of air contacts the coffee beverage flow and the small-bubbled foam layer for entraining in the flow of air an aroma of the coffee beverage which is dispensed in a direction away from the apparatus, in particular into the direction of the user, by at least one dispenser opening 31, 32.

Figure 3:
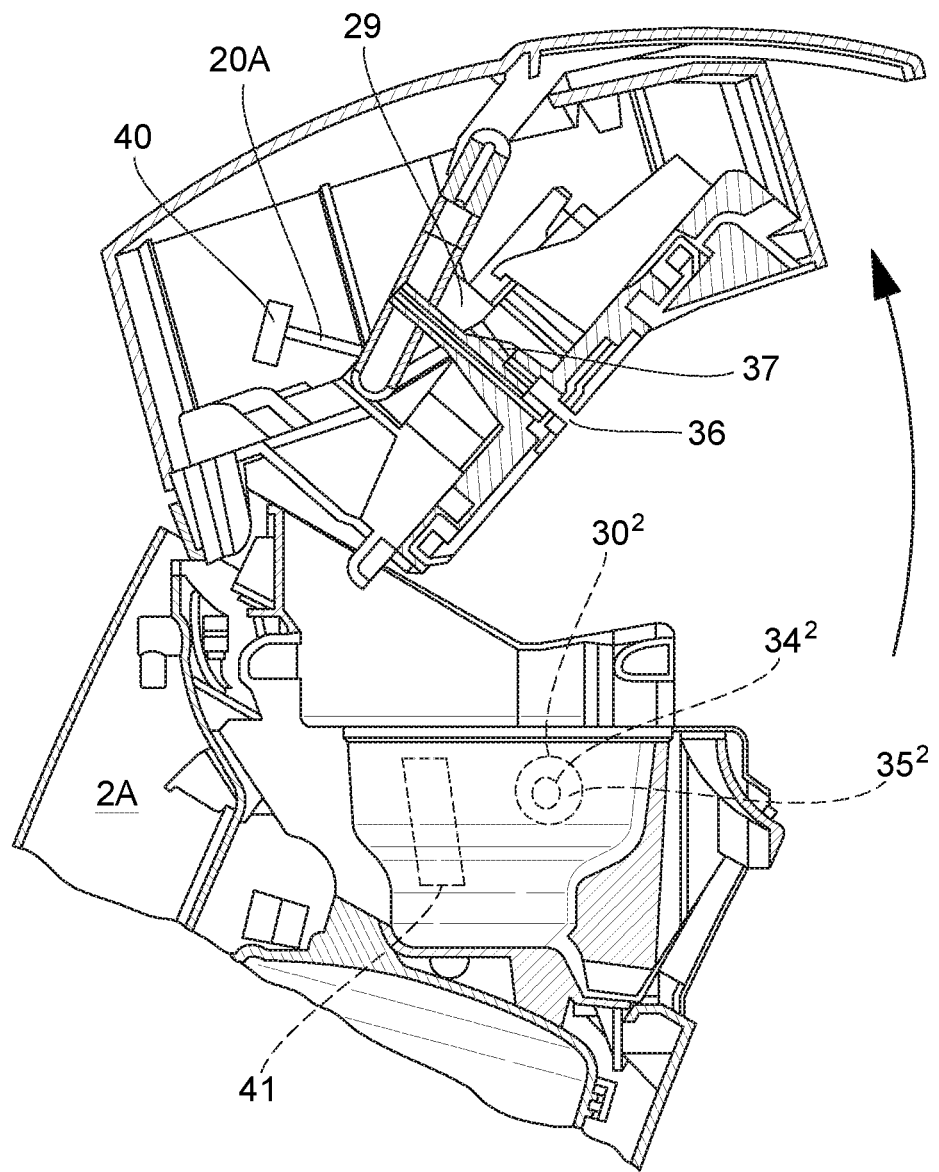
FIG. 3 is a cross section of the apparatus according to FIG. 1 in a position in which lid is opened, in which the heating device and the coffee outlet chamber have been removed and which is seen from the opposite direction in which the cross section depicted in FIG. 2 is seen.

As shown in FIGS. 2 and 3 the air flow generators 29, 30, $30^2$ may be positioned for—during operation—directing air from the interior space 2A into the coffee outlet chamber 11. Please note that although in FIGS. 2 and 3 three air flow generators 29, 30, 30² are shown which are arranged for blowing a flow of air into the coffee outlet chamber 11, in alternative embodiments the number of air flow generators for blowing air into the coffee outlet chamber can however be different from three.

As indicated in FIG. 2 the circumferential wall of the coffee outlet chamber 11 comprises a coffee outlet chamber air passage opening 33 arranged for—during operation—communicating with the interior space 2A for passing air from the interior space 2A into the coffee outlet chamber 11 by means of the air flow generator 30 (see FIG. 2) and 30² (FIG. 3). The housing comprises housing air passage openings 34, 34² which during operation when the coffee outlet chamber 11 is mounted in the housing—lies adjacent and—in the shown embodiment in line with the coffee outlet chamber air passage opening 33 so that air can pass both through the coffee outlet chamber air passage opening and the housing air passage opening. The air flow generators 30, 30² which each comprises a fan or ventilator, may then be positioned within the housing air passage opening 34, 34² or be positioned within the interior space 2A and be connected to the housing air passage opening 34, 34² by means of a air passage duct 35, 35² for blowing air from the interior space 2A via the air passage duct 35, 35² into the coffee outlet chamber 11.

In addition air can be directed from the interior space 2A to the coffee outlet chamber 11 by providing the lid 17 with a lid air passage opening 36 arranged for—during operation—communicating with the interior space 2A for passing air from the interior space 2A into the coffee outlet chamber 11 via the pouch 4. The air flow generator 29, which comprises a fan or ventilator, could in a non-shown embodiment be positioned within the lid air passage opening 36, but is in accordance with the embodiment shown in FIGS. 1 to 3 positioned within the interior space 2A and is connected to the lid air passage opening 36 by means of a air passage duct 37 for directing air from the interior space 2A via the air passage duct 37 into the coffee outlet chamber 11. The holder 3 then comprises at least one holder air passage opening 38 (FIGS. 1 and 2) arranged for—during operation—communicating with the interior space 2A via the pouch 4 and the lid air passage opening 36 and the duct 37 for passing air from the interior space 2A into the coffee outlet chamber 11 via the coffee pouch 4.

In FIGS. 1 and 2 also an alternative embodiment of an apparatus for preparing coffee beverage having a small-bubbled foam layer according to the invention is shown in which an air flow generator 30' is positioned such, in this case in the holding bridge 28, that the coffee outlet chamber 11 is positioned between the interior space 2A and the air flow generator 30' (seen in flow direction of the air flow from the interior space), such that—during operation—air is directed from the interior space 2A via the housing air passage 34 and the coffee outlet chamber air passage 33 through the coffee outlet chamber 11. For this the coffee outlet chamber can be additionally provided with a communication passage 39. Please note that in embodiments of the inventive apparatus in which the coffee outlet chamber is fixedly connected to the housing the holding bridge 28 can be dispensed with and that the air flow generator 30' is positioned within an opening of the coffee outlet chamber itself.

As shown in FIG. 3, in which for clarity reasons the coffee outlet chamber and the heating device have been taken out and which shows the apparatus in cross section seen from the opposite side as the apparatus is seen in FIGS. 1 and 2, the apparatus further comprises an air moistener 40 positioned in the interior space 2A. The air moistener 40 is arranged for—during operation—moistening air within the interior space 2A, in particular for moistening the flow of air. The air moistener 40 is positioned near the lid air passage opening 36 and is connected to the duct 20 via a branch 20A. The air moistener can be provided by any means known per se, such as a (piezo) vaporizer or a steam generator. Please note that the air passage opening 33 may be a single aperture as shown in e.g. FIG. 1, but that in the embodiment shown in FIG. 4 the air passage opening 33, 33² comprises a number of apertures. As for the single aperture, the opening area and/or the shape of the air passage apertures and/or the pattern in which the air passage apertures are provided can be adapted to provide an efficient manner of allowing air into the coffee outlet chamber 11.

Optionally the apparatus may comprise an air warming unit 41 positioned in the interior space 2A for—during operation warming air within the interior space 2A, in particular for warming up the flow of air, such that warmed up air can be directed from the interior space 2A to the coffee outlet chamber 11. The air warming unit 41 is positioned near an air passage opening, in the shown embodiment behind the air passage opening 34². The air warming unit is able to warm up the air within the interior space 2A with a temperature value in a range between 20° C. and 140° C., preferably between 20° C. and 80° C. with regard to environmental air.

The air flow generator(s) 29, 30, 30², 30' is (are) arranged for—during operation—generating an air flow in a range between 4 1/min and 20 1/min, preferably between 5 1/min and 10 1/min.

Figure 5:
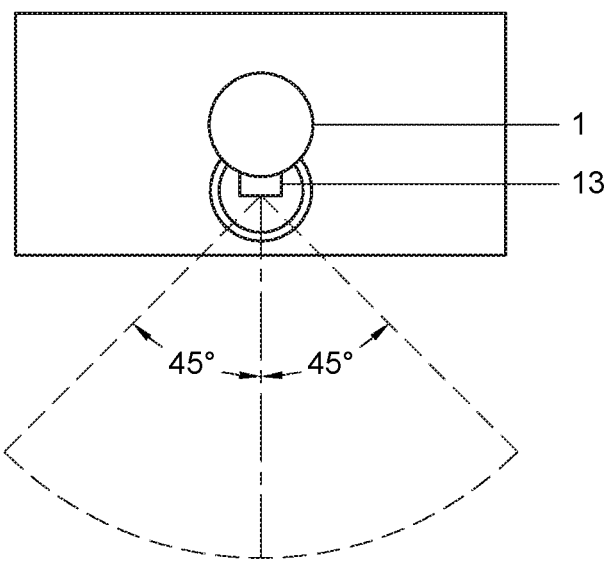
FIG. 5 shows a top view of an apparatus according to the invention indicating the zone in which the aroma is dispensed.
Figure 8:
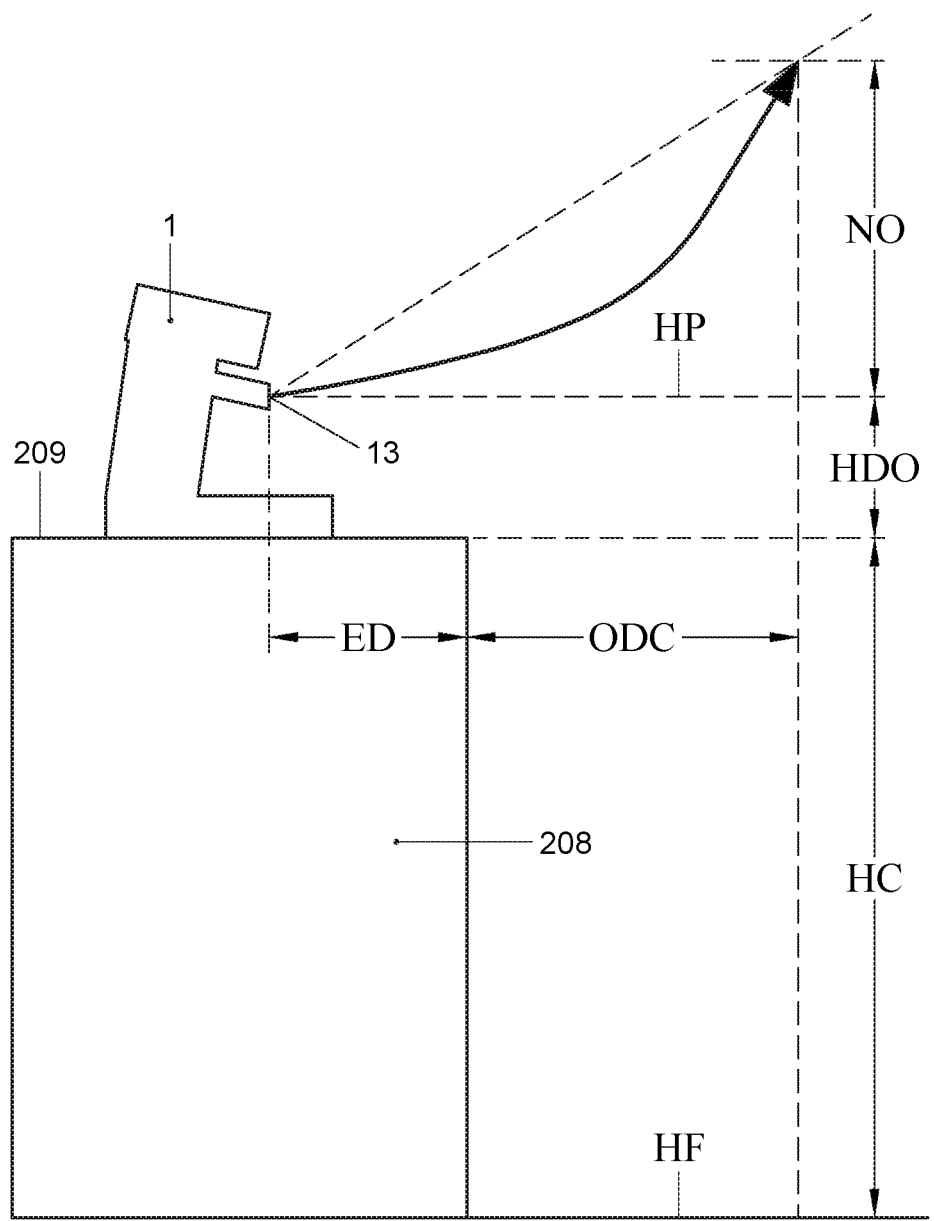
FIG. 8 shows a schematic representation of the air flow with aroma dispensed from the a dispenser opening of an apparatus according to the invention reaching the nose of a consumer standing in front of the apparatus.
Figure 11A:
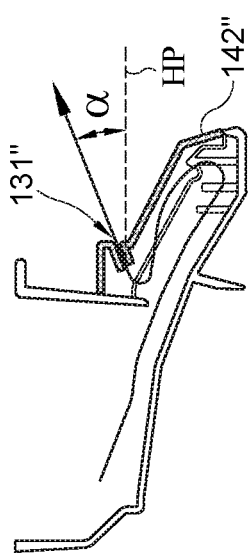
FIGS. 11A and 11B show in cross section and perspective, respectively, a still further embodiment of an apparatus according to the invention in which the dispenser opening is a rectangular slot.
Figure 10A:
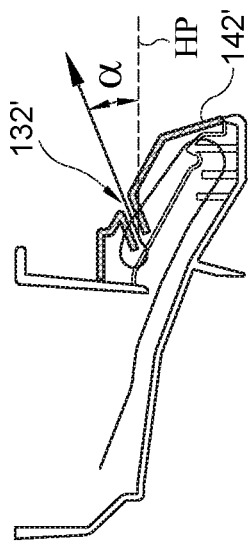
FIGS. 10A and 10B show in cross section and perspective, respectively, a further embodiment of an apparatus according to the invention in which the dispenser opening is formed by two circular dispenser openings.
Figure 9A:
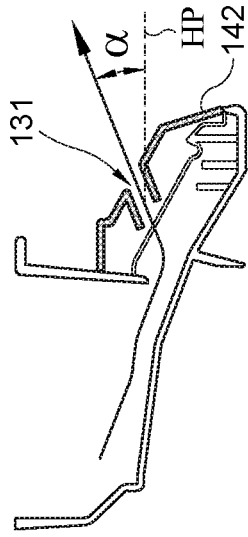
FIGS. 9A and 9B show in cross section and perspective, respectively, an embodiment of an apparatus according to the invention in which the dispenser opening is a single circular dispenser opening.
Figure 11B:
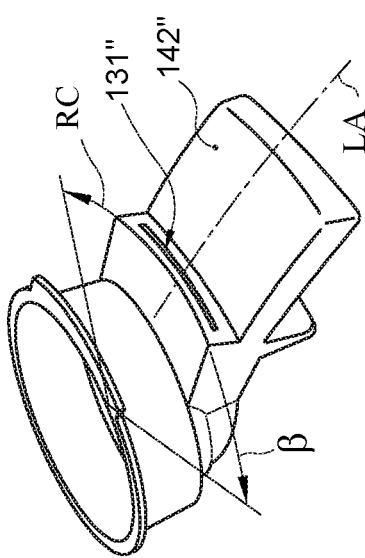
Figure 10B:
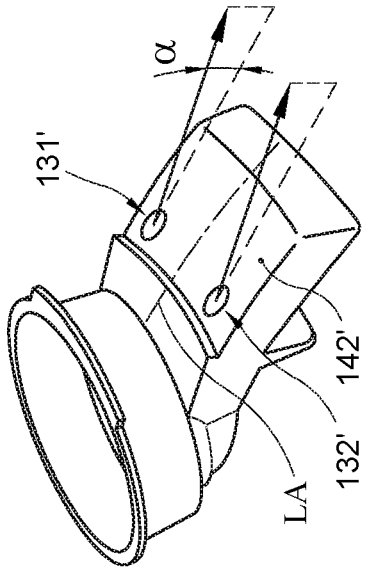
Figure 9B:
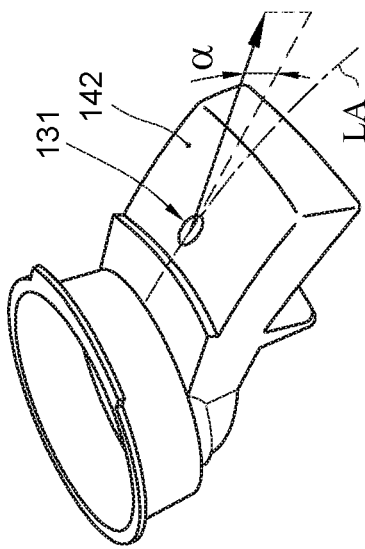
Figure 11C:
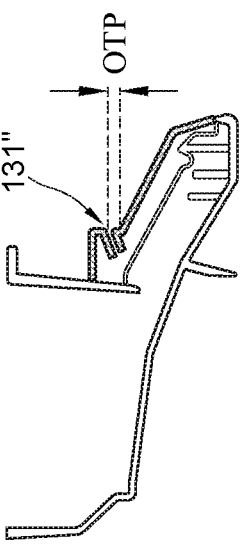
FIG. 11C shows the cross section of FIG. 11A in which the top part offset of the rectangular slot is indicated.

As indicated in the embodiments shown in FIGS. 1 and 4 the apparatus 1 comprises two circular dispenser openings 31, 32 spaced from each other on a central longitudinal axis LA of the top part 42. In an alternative embodiment (shown in FIG. 9A and 9B) the top part 142 may comprises a single circular dispenser opening (e.g. opening 131) provided on the central longitudinal axis LA of the top part or in a still further embodiment shown in FIGS. 10A and 10B two circular dispenser openings 131', 132' provided symmetrically on both sides of the central longitudinal axis LA of the top part 142' (i.e. each spaced with the same distance from the longitudinal axis LA) or a single central rectangular slot 131" (e.g. having a height of 1.5 mm) extending substantially transverse to the central longitudinal axis LA of the top part 142" as shown in FIGS. 11A-11C. The dispenser openings are dimensioned and arranged for—during operation—dispensing coffee beverage aroma in a zone extending over an angle of approximately 90°, indicated in FIG. 5. The dispenser openings may include an elevation angle of 5° to 15° with respect to the horizontal. In the FIGS. 9 through 11 the indicated angle a, refers to the elevation angle of the dispenser opening with regard to a horizontal plane HP, which can be chosen such that the dispensed aroma can in practically all instances reach the nose of the consumer standing in front of the apparatus and operating the apparatus positioned on a counter 208 as schematically shown in FIG. 8. The counter has a height HC of 0.9 m from the horizontal floor HF and the dispenser opening 13 is positioned at a height HDO of 0.15 m from the support surface 209 of the counter 208, so that the dispenser opening 13 is positioned at a height of 1.05 m above a horizontal floor HF. The dispenser opening is further positioned at a distance ED of 0.3 m from the edge of the counter 208 as indicated in FIG. 8. For an operator of average height the nose of the operator is positioned at a distance NO of 0.45 m above the dispenser opening 13 and at a distance ODC of 0.5 m from the edge of the counter 208. The air flow generator and the dispenser openings are operated and arranged such that dispensing coffee beverage aroma is effected such that the aroma reaches a height of 1.5 m above the horizontal floor at a horizontal distance of 0.8 m from the at least one dispenser opening, thus the aroma effectively reaches the nose of the operator. This can be realized in an easy manner when an air flow of 15 1/min is generated by the air flow generator and the air flow from the dispenser opening has a velocity of 5.3 m/s. Please note that these values represent an exemplary embodiment and that the invention can be performed within ranges as specified in the claims.

In the embodiment shown in FIGS. 11A to 11C the dispenser slot 131" has a height of 1.5 mm, an end angle β of 45°, a radius of curvature RC of 20 mm, an elevation angle α of 10° with respect to a horizontal plane, an air flow surface area of 30 mm$^2$ and an offset OTP from the top part of 2 mm. Please note that these values represent an exemplary embodiment and that the invention can be performed within ranges as specified in the claims.

The dispenser openings 31, 32 are provided in the duct 13, in particular in a top part 42 of the duct 13 which—in this embodiment—is detachably connected to a bottom part 43 of the duct 13. The free end of the outlet duct 13 forms the outflow opening 10 for discharging coffee beverage from the apparatus, which coffee beverage flows over the bottom part 43 of the outlet duct 13. Please note, that in case use is made of only the air flow generator 30', the dispenser opening is formed be the outlet end of the air flow generator, and that no additional dispenser openings are necessary. The housing 2 is provided with a vent opening 52 communicating with the atmosphere surrounding the apparatus 1 to prevent an underpressure being created within the interior space when the air flow generator draws air from the interior space. Please note, that in other embodiments such a vent opening can be dispensed with since the housing is not a hermetically closed housing.

As indicated in FIG. 4 the apparatus 1 comprises a control unit 55 for controlling the functioning of the apparatus 1. The control unit 55 is operatively connected to a user operated heating up button 50 and operatively connected to the heating device via a pertly drawn broken line. The heating device is activated after a user has activated the user operated heating up button 50. The control unit 55 is further operatively connected to a user operated aroma dispensing button, which can be a separate button or the user operated heating up button 50 for controlling, e.g. activating the air flow generator after a user has activated the user operated aroma dispensing button. In particular the control unit 55 is arranged for activating the air flow generator a predetermined time period after the user operated heating up button 50 has been activated.

FIG. 4 in addition shows an alternative embodiment of an apparatus 1 in which the control unit 55 is furthermore operatively connected to a user operated brewing button 51 (in FIG. 4 two buttons are shown; one for a single cup of beverage and the other one for two cups of beverage to be brewed and discharged) and operatively connected to the water supplying device for supplying water via the liquid duct after a user has activated the user operated brewing button 51. In this alternative embodiment the user operated aroma dispensing button is formed by the user operated brewing button 51. The control unit 55 is arranged for activating the air flow generator after the user operated brewing button 51 has been activated, preferably a predetermined time period of at least 3 seconds after the user operated brewing button has been activated.

In the embodiment shown in FIG. 4 the coffee container 4 is provided with means 60 comprising readable id-information, e.g. regarding the type of coffee contained in the container 4 and the manufacturer of the container. The apparatus comprises a reader 61 for reading the readable id-information on the coffee container 4. The reader 61 is operatively connected to the control unit 55 for providing a reading signal to the control unit 55, which signal is indicative for the read id-information. The control unit 55 is arranged for automatically controlling the air flow generator $30^2$ in dependence of the reading signal received from the reader 61.

Figure 6A:
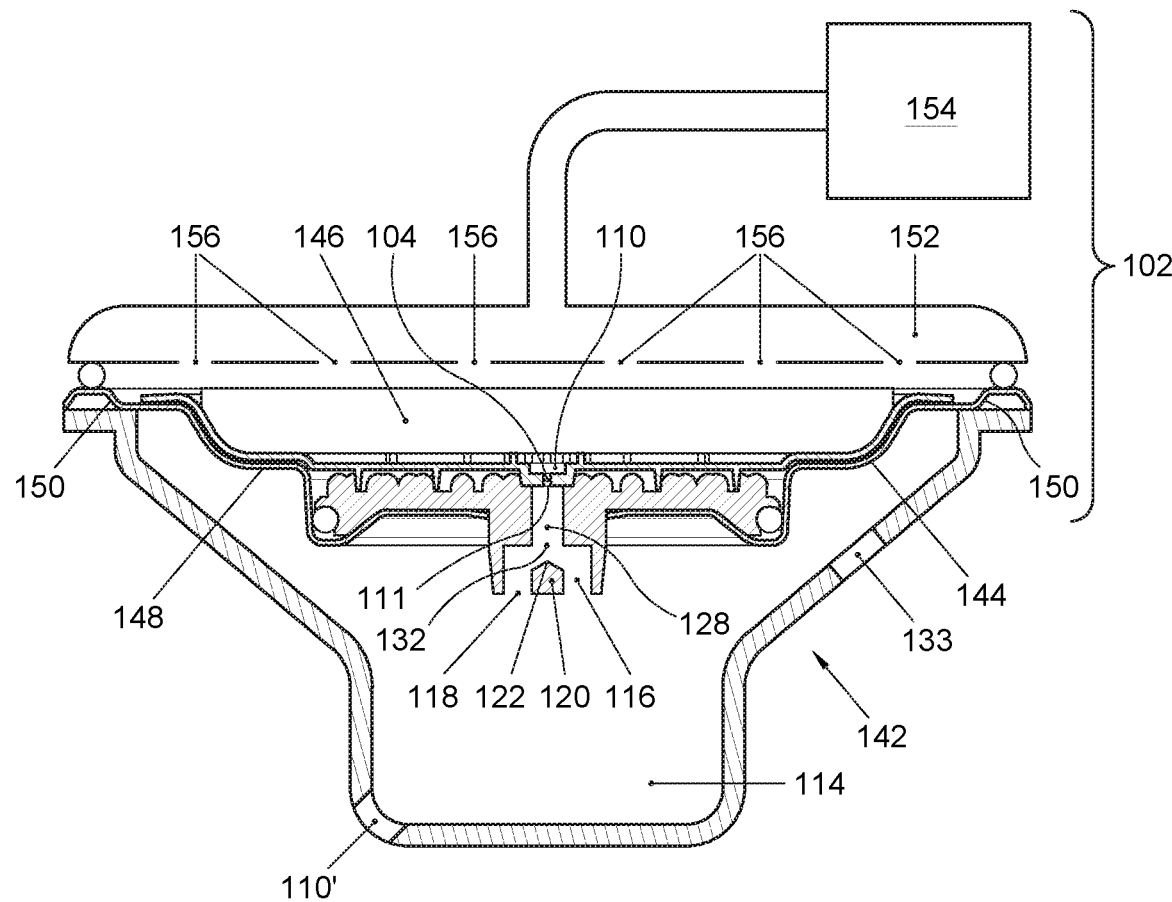
FIGS. 6A and B show a second and third embodiment of an apparatus according to the invention in which the holder comprises a foam chamber with a jet impact element.
Figure 6B:
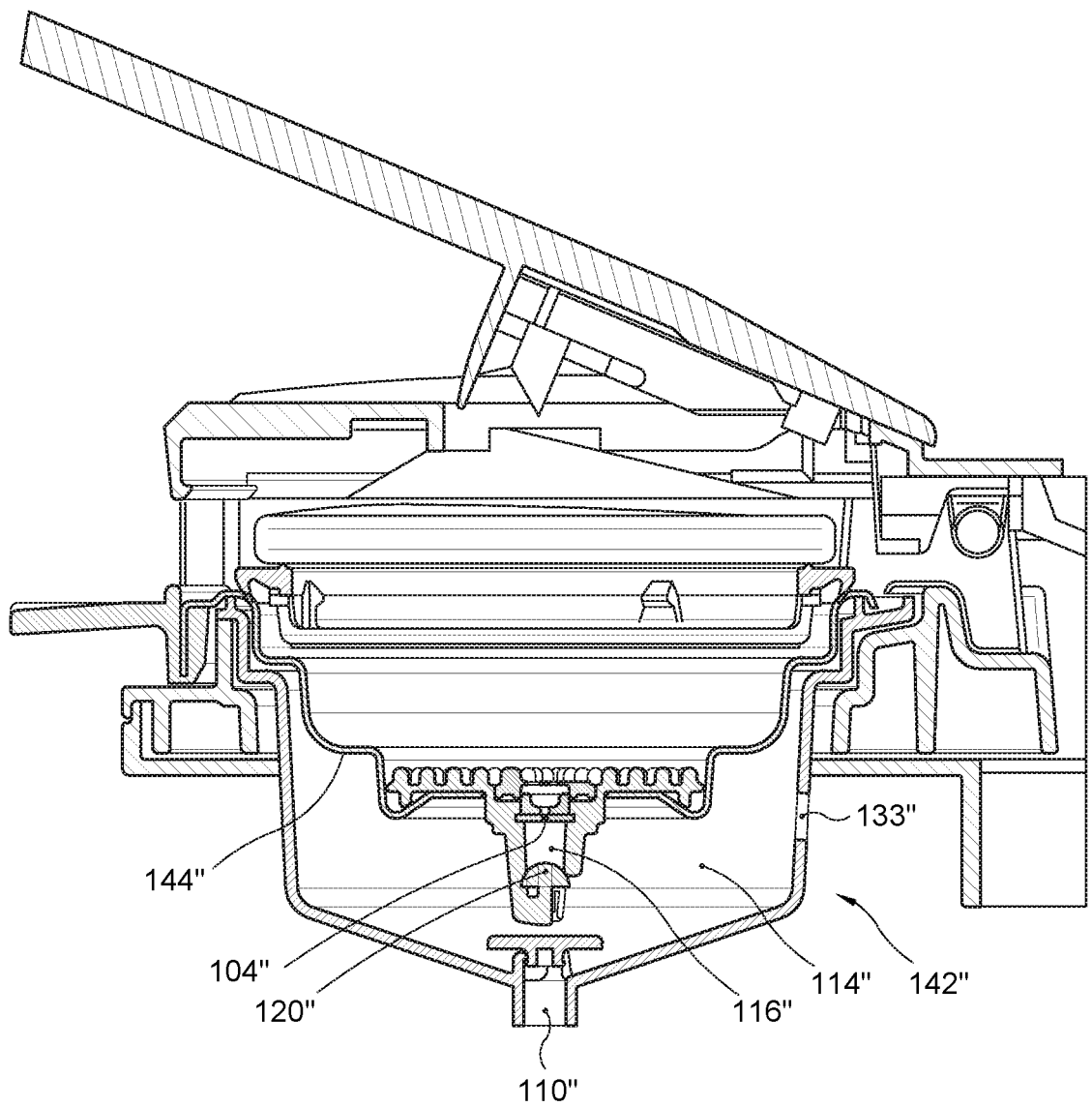

In FIGS. 6A and 6B a second and third embodiment of an apparatus according to the invention is shown in which the orifice is arranged for generating a coffee beverage jet, and the holder is integrally provided with a foam chamber 116, 116" having a jet impact element 120, 120", wherein the foam chamber extends into the coffee outlet chamber. To more clearly describe this embodiment, it is remarked that not all parts shown in FIGS. 6A and 6B are drawn to scale and in particular the foam chamber 116, 116" comprising the jet impact element 120, 120" is shown enlarged. In reality the size of the foam chamber is comparable to the recess 7 shown in FIG. 1. The apparatus comprises a unit 142, 142" which is provided with a coffee outlet chamber 114, 114". The unit 142, 142" comprises the orifice 104, 104". Besides, the unit 142, 142" comprises a holder 144, 144" for receiving a pad 146 which is filled with a product to be extracted, such as ground coffee. The holder 144, 144" and the pad 146 may be of a type as described in EP-A1-1371311. The holder 144, 144" is provided with a cup-shaped bottom 148 which is bounded by an upright side wall 150. The upright side wall extends around the bottom. The bottom and the upright side wall thus bound a cup-shaped inner space of the holder in which, in use, the pad is received. The pad 146 extends over the bottom 148 to the upright side wall 150. In the bottom 148 is provided an outflow opening which, in this example, is formed by the orifice 104, 104". This outflow opening forms an outlet of the holder. In this example, the inlet 110 of the orifice is also in fluid communication with the outlet of the holder, because the inlet 110 and an outlet 111 of the orifice form the outlet of the holder. Also, grooves are provided in the bottom of the holder. The apparatus further comprises a lid 152 with which the holder can be closed. The apparatus further comprises a hot water unit 154 for supplying hot water under pressure to an inner space of the lid 152. The lid 152 is provided at its bottom side with a number of outflow openings 156. In use, hot water is thus supplied via the outflow openings 156 to a top side of the holder 144, 144". The holder 144, 144" and the hot water unit 154 form, in combination, a beverage unit 102.

Figure 12:
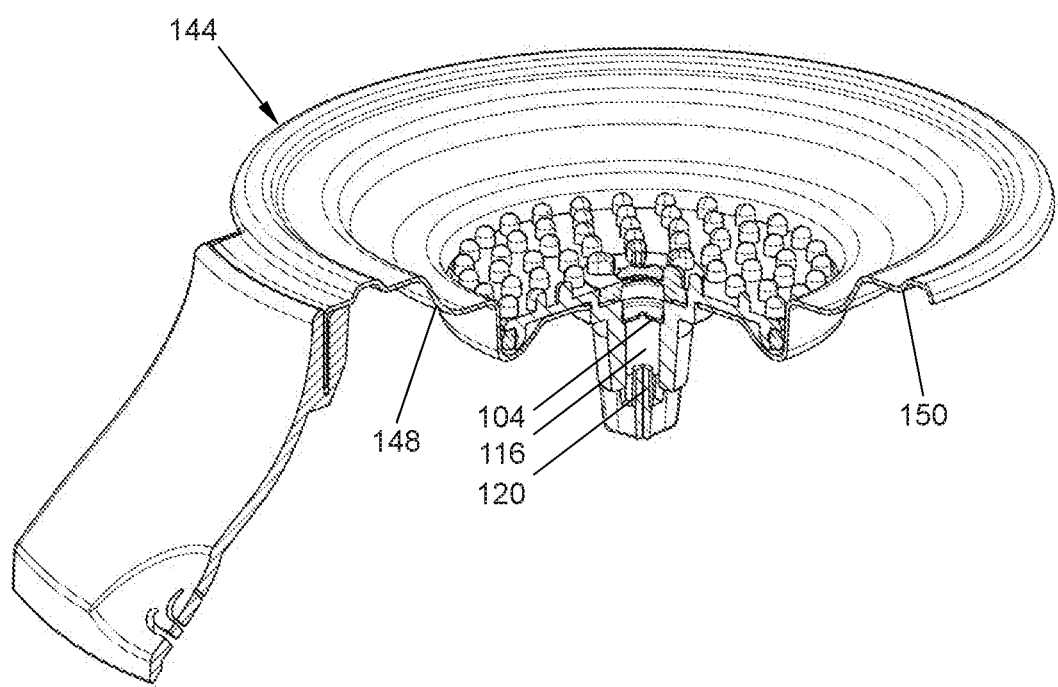
FIG. 12 shows a perspective view, partly in cross section, of an embodiment of a pad holder of an apparatus for preparing coffee beverage according to the invention as shown in FIG. 6.

In this example, it holds that a coffee outlet chamber air passage opening 133, 133" is provided for allowing a flow of air introduced in the coffee outlet chamber to come into contact with the beverage with the fine-bubbled foam layer leaving the chamber 116, 116" via the product supply opening 132 and the outflow opening 118. The jet impact element 120, 120" is, in this example, connected with the foam chamber 116, 116" by means of three cross arms, which is more clearly visible in the FIG. 12 showing a perspective view, partly in cross section, of the pad holder 144.

The apparatus of the embodiments shown in FIGS. 6A and 6B operate as follows. By means of the hot water unit 154 hot water is supplied under pressure to the inner space of the lid 152. This hot water leaves the lid 152 under pressure via the outflow openings 156 of the lid 152. Hot water is thus supplied to the top side of the holder 144, 144". This water is pressed through the pad 146 which, in this example, is filled with ground coffee. There is thus formed a coffee extract which leaves the holder 144, 144" via the orifice 104, 104". Because the coffee extract is supplied to the orifice 104, 104" under pressure, a jet of the beverage is thus formed. This jet 112 impacts on top of the top 122 of the jet impact element 120, 120" and generates a strong vaporization of coffee beverage micro droplets and formation of coffee beverage aroma in the enclosed area of the foam chamber 116, 116". The beverage with the fine-bubbled foam layer, in this example the coffee extract with the fine-bubbled foam layer, leaves the chamber 116, 116" via the outflow opening 118 and enters the coffee outlet chamber 114, 114" where it finally is discharged via the opening 110', 110".

Figure 7:
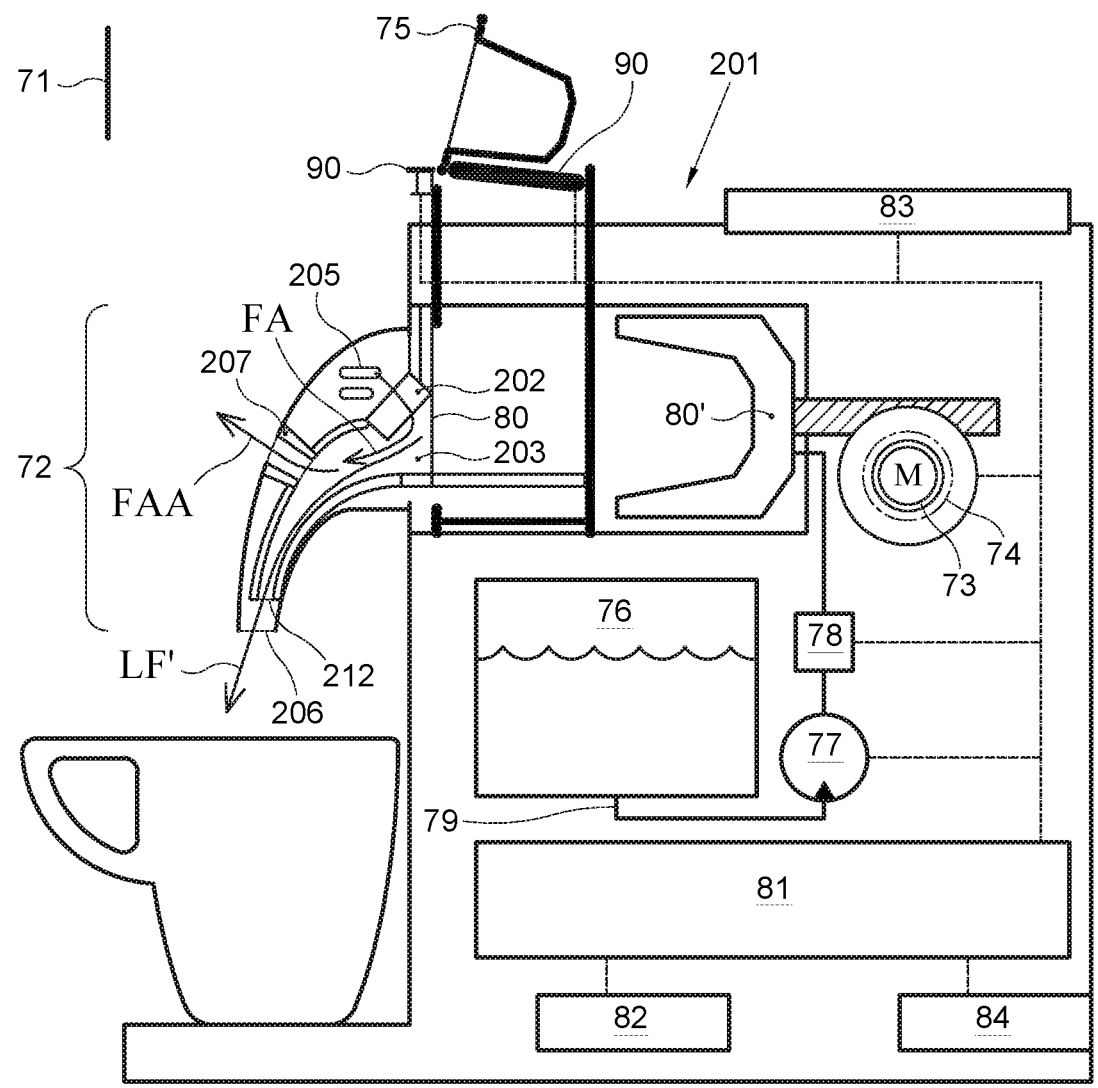
FIG. 7 shows a further embodiment of an apparatus according to the invention in which an air flow generator generates a flow of air in the coffee outlet chamber and coffee beverage aroma is dispensed in a direction away from the apparatus, in particular into the direction of the user, through a dispenser opening.

FIG. 7 shows a further embodiment of an apparatus, in this embodiment an espresso machine 201 according to the invention in which an air flow generator, in the shown embodiment a fan 202, generates a flow of air FA in the coffee outlet chamber 203 having a coffee beverage passage 212. The fan 202 draws in ambient air via air openings 205 provided in the housing of the machine. Such an apparatus is for example known from EP-A-2,103,236 or EP-A-2,205,133 and will be shortly described in the following with reference to FIG. 7. The apparatus according to this embodiment comprises a brewing unit 72 which is coupled with an electrical motor 73 driving transmission means 74 for moving the brewing unit between an opened and a closed position. The brewing unit is represented in the opened position on FIG. 7. The brewing unit allows the preparation of a beverage from a capsule 75 containing at least one ingredient, e.g. ground coffee or tea or chocolate. The capsule 75 has a generally cup-shaped body and a lid such as a covering membrane. The membrane is assembled to the cup along a peripheral rim of the cup. The rim may comprise a seal, e.g. made of elastomeric or plastic material, for improving the fluid-tight engagement of the capsule in the brewing unit. Furthermore, the capsule in particular the rim and/or the membrane may bear a ring or toroid, e.g. for assisting manufacturing and/or handling of the capsule. Such capsule forms a packaging for containing an ingredient, e.g. ground coffee, of a beverage to be prepared with the apparatus. In an embodiment, the capsule forms a gastight packaging, e.g. made of aluminum or an aluminum-alloy. Such a capsule is during use opened in the apparatus. Alternatively, the capsule may be more or less pervious, e.g. perforated and/or made of organic, in particular plastic material, e.g. biodegradable material. The capsule's cup and/or the capsule's lid may be made of a monolithic material, e.g. a metallic material or a conductive ceramic and/or conducive organic material, or may be made of a structure covered or containing a conductive material, e.g. a conductive coating or track, e.g. an aluminum, iron and/or copper coating or track. As represented in FIG. 7, water supply means are also provided as a part of the machine, such means including a water reservoir 76, a water pump 77 and a water heater 78. Water circulates in a water circuit 79 which is linked to the brewing unit. A controller is also provided in the apparatus 201. The controller includes typically a control unit 81, sensors 82 and a user interface 83. The control unit includes processor(s), memories and programs enabling to provide appropriate inputs to and receive outputs from the different activation means of the machine in particular, the pump, heater, motor, fan 202 and user interface. The apparatus 201 further comprises a capsule positioner 90, which may function as a capsule identification unit, having a seat, for example, a capsule support, adapted to receive the capsule 75 out of the brewing chamber, and preferably outside the brewing unit. The brewing unit comprises an extraction plate 80 and an injection second assembly 80' which are movable relatively one another. In this particular embodiment, the injection assembly 80' represents a part of a capsule holder including injection blades (not shown). The extraction plate 80 comprises at least one orifice (not shown) for generating a coffee beverage flow. The orifice in the extraction plate 80 opens into the coffee outlet chamber 203 which is in connection with the beverage outlet 206. The liquid flow path LF' extends between the orifice in the extraction plate 80 and the outflow opening of the apparatus 206 for discharging coffee beverage, while the coffee outlet chamber 203 is included in the liquid flow path. The fan 202 is arranged for—during operation—generating a flow of air in the flowing coffee beverage passing through the coffee outlet chamber 203 so that aroma is entrained in the flow of air FAA leaving the at least one dispenser opening 207 for dispensing coffee beverage aroma in a direction away from the espresso machine 201. Please note that the apparatus can be arranged such that the outflow opening 206 and the coffee beverage passage 203 are formed by one and the same opening, e.g. by extending the coffee beverage passage 203.

With regard to FIGS. 13 to 20 several embodiments of coffee containers suitable for use in the apparatus, system or method according to the invention are shortly discussed. It will however be clear that the present invention is not limited to the disclosed coffee containers, but encompasses all coffee containers falling within the scope as defined by the claims.

In FIGS. 13, 14A and 14B the coffee container is a flexible, disc-shaped/flat type pad 301 filled with a product 302 to be extracted such as ground coffee and/or a product to be dissolved such as a creamer, provided with a flexible bottom sheet 304 manufactured from, for instance, filtering paper and a flexible top sheet 306 manufactured from, for instance, filtering paper. The top sheet 306 and the bottom sheet 304 are interconnected at their longitudinal edges so that a covering with a circumferential sealing seam 308 is formed, with the product situated between the top sheet 306 and the bottom sheet 304. The bottom sheet 304 and the top sheet 306 each form a filter which is at least virtually impermeable to the product 302 and which is at least permeable to water, while an area 310 of the covering is designed to be at least virtually impermeable to water. The area 310 comprises, preferably, at least one annular sub-area 312 covering at least a part of the sealing seam 308 and the area 310 extends outside the sealing seam 308 at predetermined positions. For more details of this pad reference is made to US-A-2008/0148958.

Figure 15A:
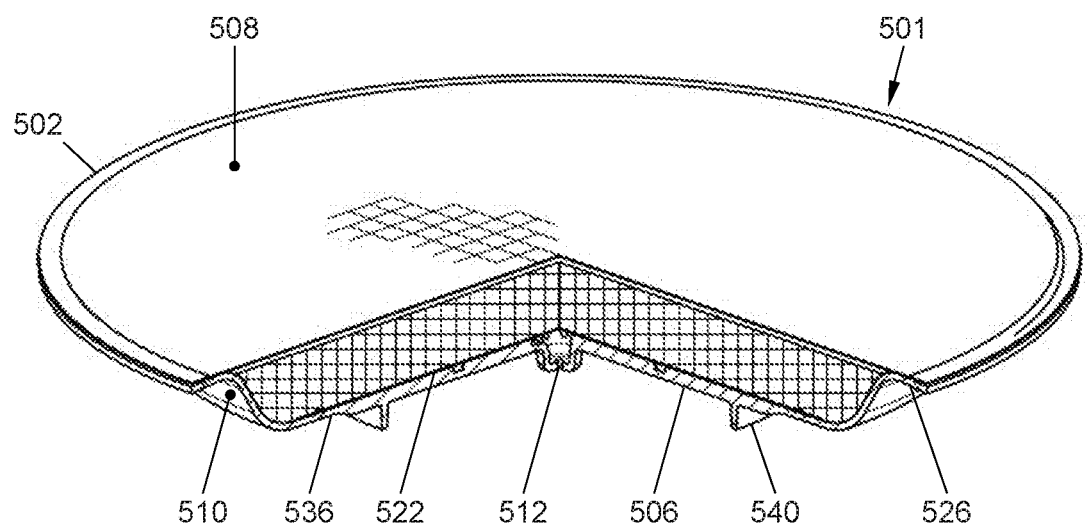
Figure 15B:
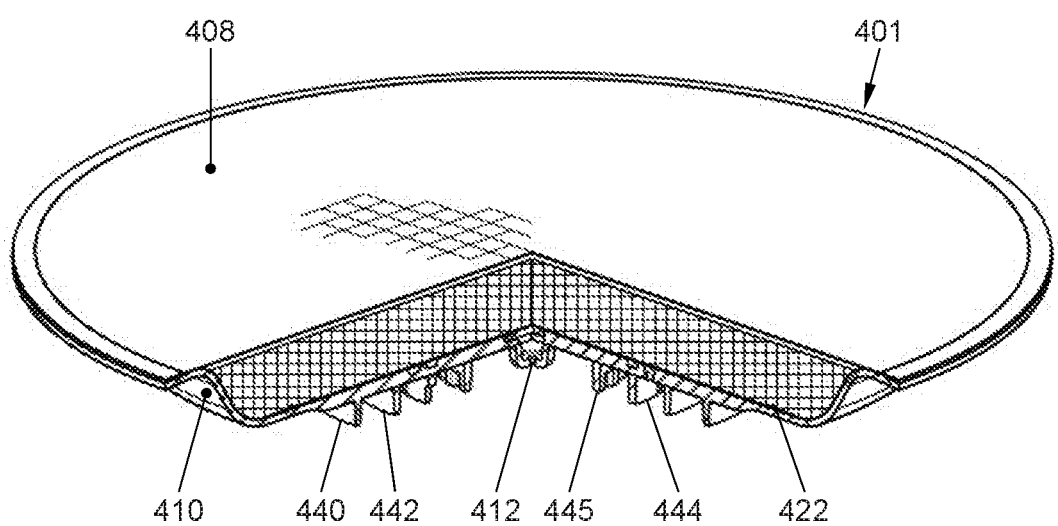

In FIGS. 15A, 15B the coffee container is a pad 401, 501 adapted to receive an aqueous fluid that is supplied under pressure to the pad 401, 501 so that the fluid is forced through the pad 401, 501 for obtaining the coffee beverage. The pad 401, 501 includes a covering 502 defining an interior space that is filled with a beverage preparation product for preparing the beverage wherein the beverage preparation product includes a product including ground coffee extractable with an aqueous fluid. The covering 502 comprises a flexible first sheet 408, 508 and a rigid shell 410, 510, wherein the first sheet and the shell are connected to each other around their perimeter edges. The shell 410, 510 is equipped with at least one outlet opening 412, 512 and with a second sheet 422, 522 that is positioned on a bottom of the shell. The second sheet 422, 522 is located between the beverage preparation product and the shell 410, 510 and the first sheet and the second sheet each form a filter that allows an aqueous fluid, including water, and the beverage to pass and that forms a barrier for the beverage preparation product so that, when in use an aqueous fluid under pressure is supplied to the first sheet of the pad the fluid flows through the first sheet 408, 508 to the beverage preparation product so that the beverage is formed which beverage then flows through the second sheet 422, 522 and via the at least one outlet opening 412, 512 leaves the pad. The at least one outlet opening 412, 512 further includes a flow restriction for the beverage. For more details of this pad reference is made to WO-A-2014/163498.

Figure 16A:
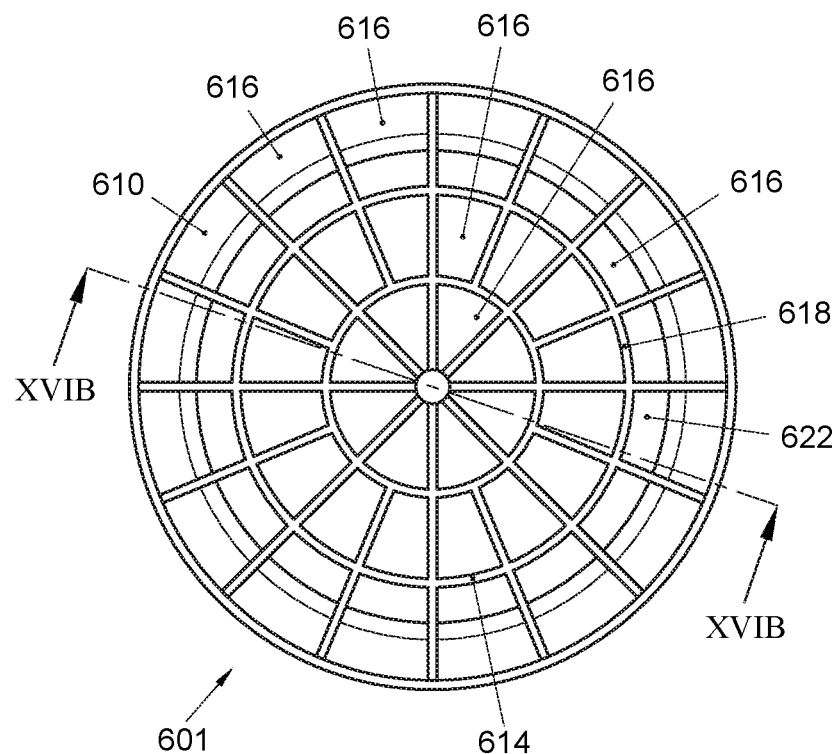
Figure 16B:
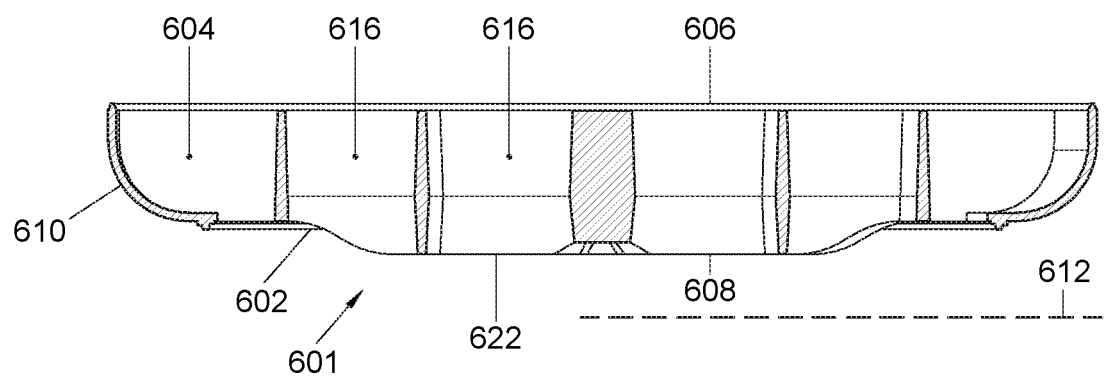

In FIGS. 16A-16B the coffee container is a form-retaining pad 601, provided with at least a first covering 602, in which a product to be extracted, such as ground coffee, with a fluid substance and/or, product soluble in a fluid, such as coffee powder, milk powder/creamer, sugar and similar additives, is included. The covering 602 comprises a top sheet 606, manufactured from a material non-transmissive to the extractable and/or soluble substance, such as a layer of filter material, and a bottom sheet 608, manufactured from a material non-transmissive to the extractable and/or soluble substance, but transmissive to the substance dissolved in a liquid or the extracted liquid, such as a layer of filter material. The pad 601 is further provided with a form-providing stiffening body 610, which is placed between the top sheet 606 and the bottom sheet 608. The top sheet 606 and the bottom sheet 608 extend at least partly substantially parallel to each other and to a surface 612, wherein the stiffening body 610 has a top side 618 adjacent to the top sheet 606 and a bottom side 622 adjacent to the bottom sheet 608. The stiffening body 610 is providing with a compartmenting wall configuration therein, to form a grid structure 614 which is transmissive to liquid from the top side to the bottom side. In the grid structure 614 at least a part of the extractable and/or soluble substance is accommodated and each compartment 616 formed by the wall configuration is surrounded by that wall configuration, the top sheet and the bottom sheet. For more details of this pad reference is made to EP-A-1,398,279.

Figure 17:
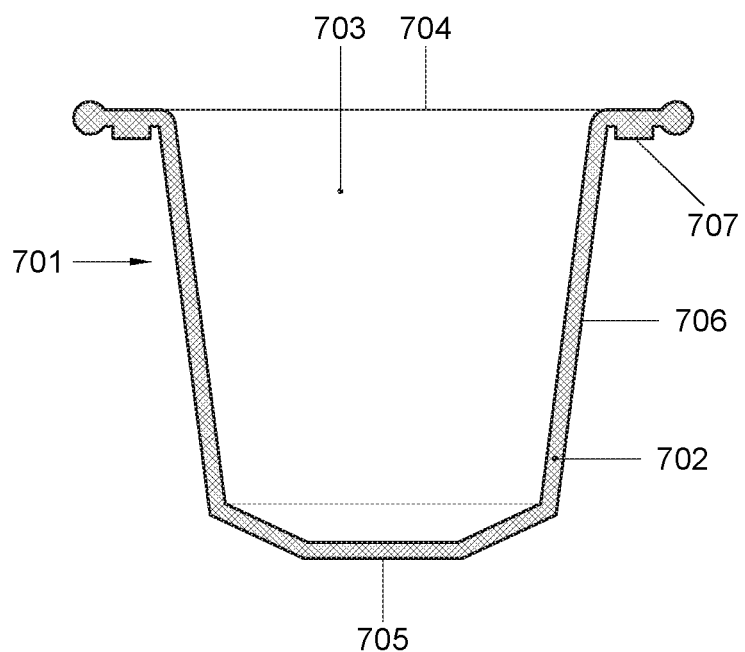

In FIG. 17 the coffee container is a sealed cartridge 701 formed by a cup 702 having a base 705 and a frustoconical sidewall 706 which extends from the base to a lip 707 which extends laterally away from the sidewall about a cup opening, the opening deemed herein to be defined by an edge extent of the sidewall away from the base. The opening is covered by a tear face cover 704 sealed to the lip and which has a thickness less than that of the cup base and wall. The diameter of the opening is greater than a diameter of the base. The cartridge can contain a coffee substance 703. The cartridge 701 is used for preparation of a beverage by extraction of the substance under pressure comprising a cup 702 and a cup cover 704 sealed to the cup and roast and ground coffee substance contained by the cover within the cup. There are no marks in the cover 704 for weakening the cover and there is no filter member contained within the cup and cover. The cup 701 comprises a base 705, a sidewall 706 which extends from the base to an edge about a cup opening which opposes the base and a lip 707 which extends laterally away from the sidewall edge and the opening. The cover 704 extends across the opening to the lip 707 and is sealed to the lip 707 so that the roast and ground coffee substance is contained within the cup by the cover. The cup 701 and cover 704 are substantially impermeable to oxygen. The thicknesses of each of the cup base 705, sidewall 706 and lip 707 are preferably greater than the thickness of the cover 704. The cover 704 preferably has a thickness and a breaking stress so that upon placement of the sealed cartridge in the apparatus the sealed cartridge is positioned in the holder and the cover is adjacent projections of the apparatus for forming a plurality of openings in the cover which allow flow of coffee beverage extracted from the roast and ground coffee substance through the cover and which restrict roast and ground coffee substance escape from within the cartridge via the openings. Upon injection of water under pressure within the cartridge and into the roast and ground coffee substance positioned in the holder the pressure within the cartridge can increase to within a range of from 2 bar to 20 bar, so that the cover initially deforms and portions of the cover contact and press against the projections and the water wets and compacts the roast and ground coffee substance. Subsequently, at a pressure within the range of from 2 bar to 20 bar, the cover portions that are pressed against the projections reach their breaking stress, break and form the plurality of openings for coffee beverage flow and for restricting the roast and ground coffee substance escape through the cover via the openings. For more details of this cartridge reference is made to U.S. Pat. No. 5,897,899.

Figure 18:
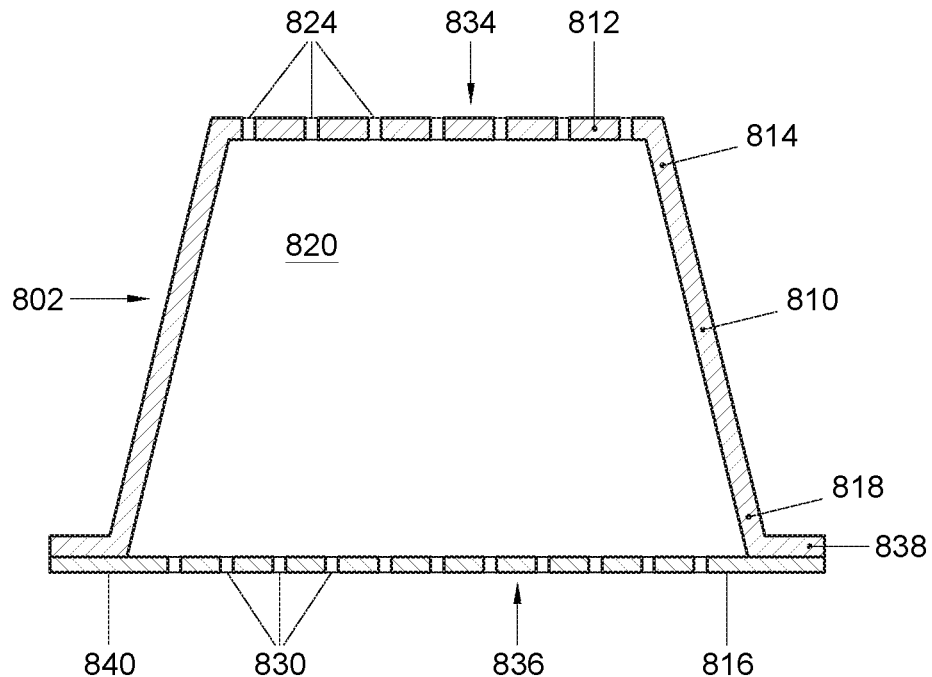

In FIG. 18 the coffee container is a capsule 802 comprising a circumferential wall 810, a bottom 812 closing the circumferential wall 810 at a first end 814. A lid 816 closes the circumferential wall 810 at a second end 818 opposite the bottom 812. The wall 810, bottom 812 and lid 816 enclose an inner space 820 comprising an extractable coffee product. The bottom 812 comprises an entrance area arranged for supplying there through a fluid under pressure to the extractable coffee product for preparing the coffee beverage. The lid 816 comprises an exit area 836 for draining there through the prepared beverage from the capsule 802. The entrance area of the capsule 802 comprises an entrance filter 834 for supplying the fluid to the extractable product there through. In FIG. 18 the bottom 812 is integral with the circumferential wall 810. The entrance filter 834 is formed by the plurality of entrance openings 824 in the bottom 812. The exit filter 836 is formed by a foil 840, e.g. a flexible polymeric foil, provided with a plurality of exit openings 830. For more details of this capsule reference is made to WO-A-2009/110783.

Figure 19:
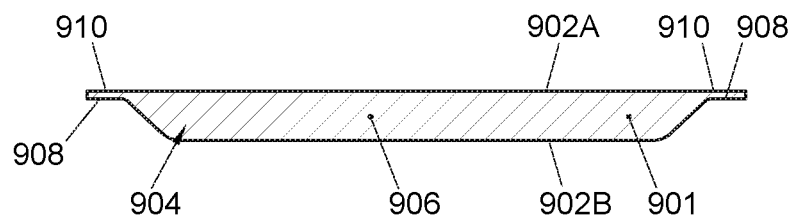

In FIG. 19 the coffee container is a pad 901 provided with an envelope 902A, 902B with an inner space 904 which is filled with a beverage preparation product 906 for preparing the beverage. The beverage preparation product comprises a product to be extracted with a fluid and/or a product soluble in a fluid. The envelope is formed by a first disc-shaped sheet 902A and a second disc-shaped sheet 902B which are interconnected adjacent their longitudinal edges 908. The interconnected parts of the first sheet 902A and the second sheet 902B form a sealing seam 910 and the first sheet 902A and the second sheet 902B each form a filter which can pass a fluid and which forms a barrier to the beverage preparation product 906. In use, a fluid such as water is supplied, under pressure, to the pad 901 so that the fluid is pressed through the pad for obtaining the beverage which thereupon leaves the pad, wherein the second sheet 902B is of form-retaining design. For more details of this capsule reference is made to WO-A-2014/007639

Figure 20:
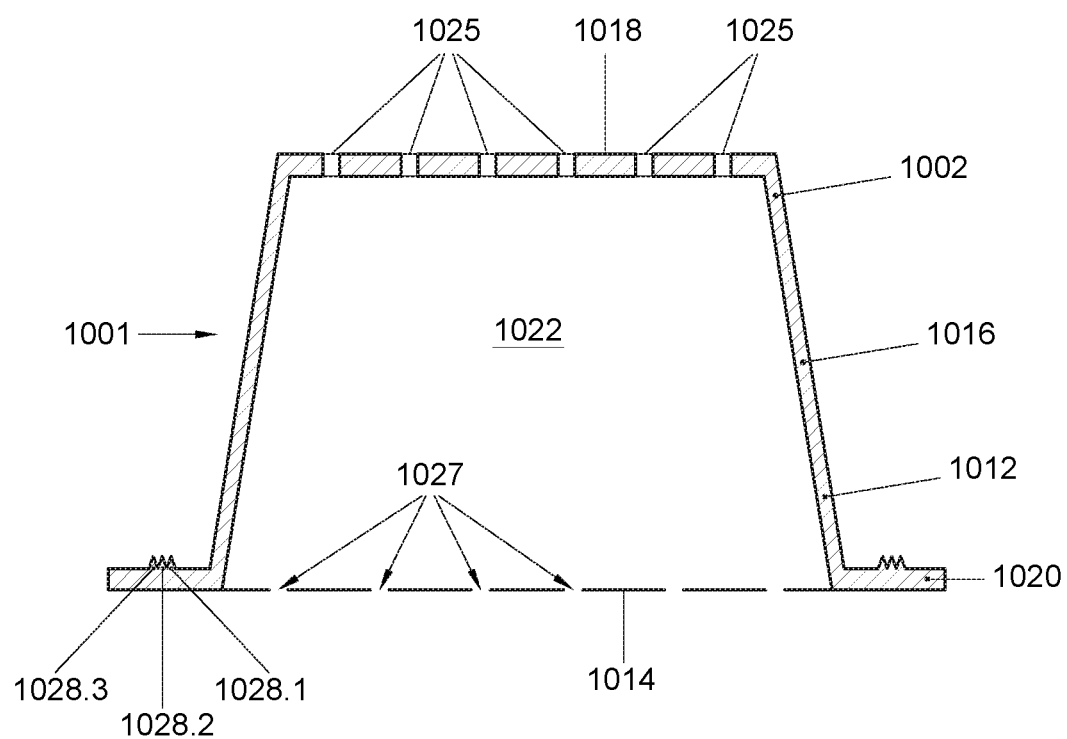
Figure 21:
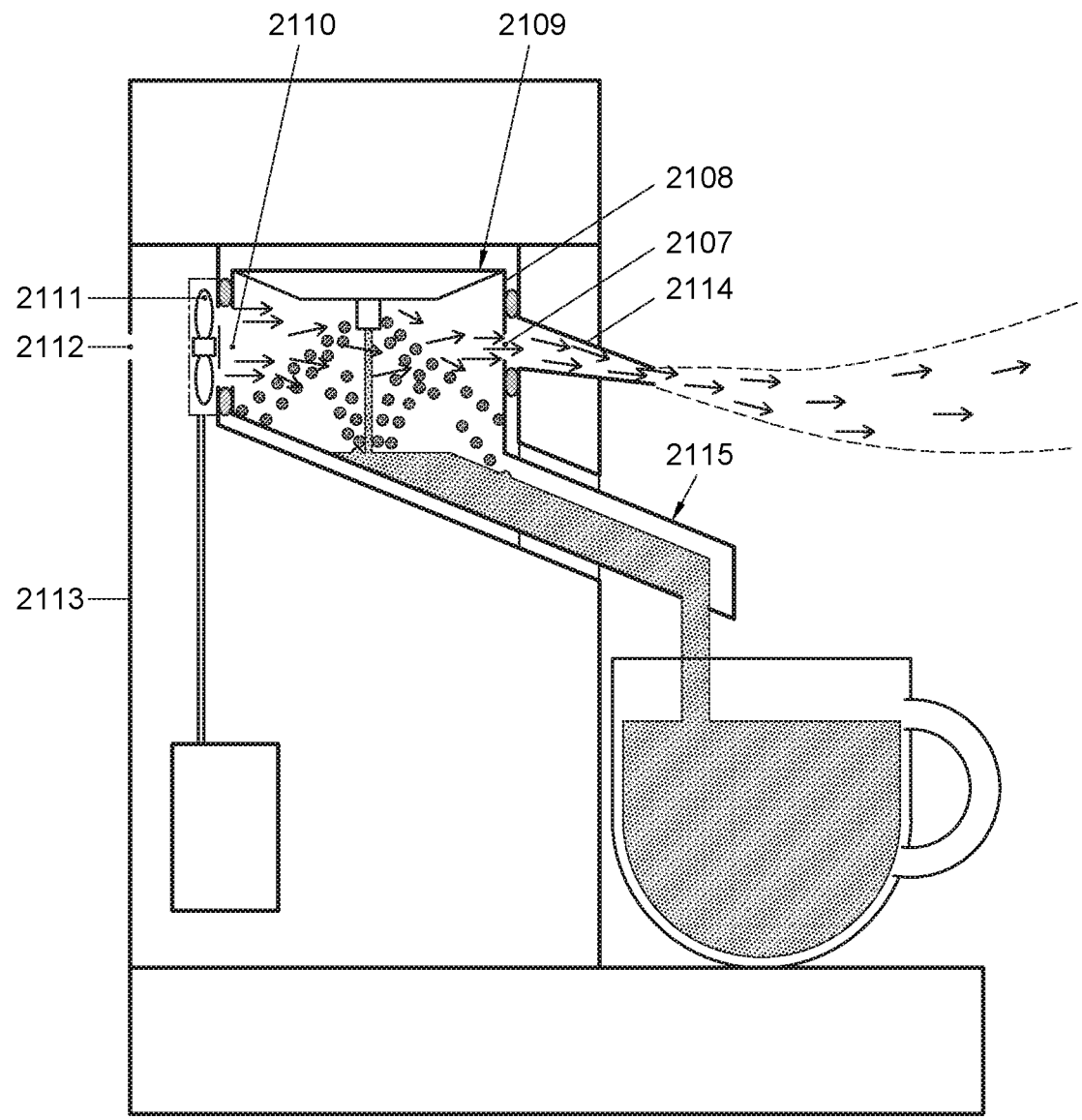
FIG. 21 shows an alternative embodiment of an apparatus according to the invention in which an air flow generator generates a flow of air in the coffee outlet chamber and coffee beverage aroma is dispensed in a direction away from the apparatus, in particular into the direction of the user, through a dispenser opening and an aroma passage channel.
Figure 22:
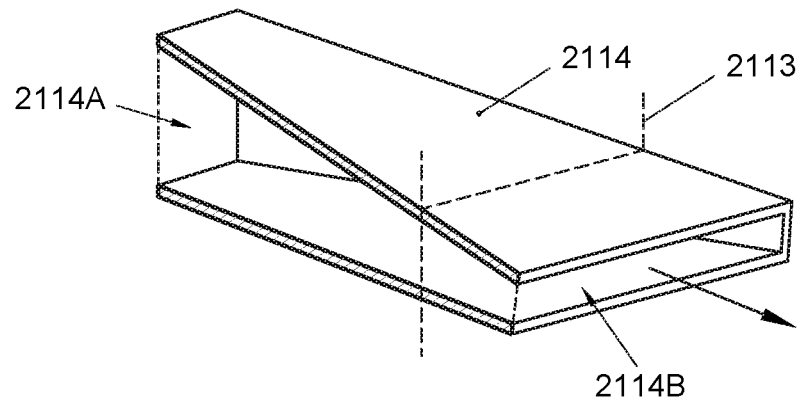
FIG. 22 schematically shows the aroma passage channel of the embodiment shown in FIG. 21 in perspective.

In FIG. 20 the coffee container is a capsule 1001 comprising a cup 1002 comprising a circumferential wall 1016, a bottom 1018 closing the circumferential wall 1016 at a first end, and a flange-like rim 1020 extending outwardly of the circumferential wall 1016 at a second end opposite the bottom. In use a lid 1014 is connected to the flange-like rim 1020. The wall 1016, bottom 1018 and lid 1014, in use, enclose an inner space 1022 comprising an extractable coffee product. The cup further comprises a plurality of substantially concentric circumferential ridges 1028.1-1028.3 extending outwardly of the cup, wherein the ridges 1028.1-1028.3 are made of the same material as the cup. Hence, the capsule 2 comprises pre-made entrance openings 25. The bottom 1018 comprises in this embodiment premade entrance openings 1025 and the lid 1014 comprises premade exit openings 1027. The exit openings 1027 may be through holes in a foil-like lid 1014, e.g. manufactured from plastics material, or may be pores in a porous lid, e.g. manufactured from a non-woven material such as filter paper. For more details of this capsule reference is made to WO-A-2010/137954. In FIG. 21 an alternative embodiment of an apparatus for preparing a coffee beverage according to the invention is shown schematically. The at least one dispenser opening 2107 is provided in the circumferential wall 2108 of the coffee outlet chamber 2109. The at least one dispenser opening 2107 is separate from the coffee outlet chamber air passage opening 2110 through which air is directed by means of the air flow generator 2111. The air flow generator is positioned near the circumferential wall 2108 of the coffee outlet chamber 2109 and draws in air from the environment through the housing air passage opening 2112 extending through the housing 2113. In the apparatus an aroma passage channel 2114 is provided which—during operation—communicates with the at least one dispenser opening 2107 for passing aroma from the coffee outlet chamber 2109 in a direction away from the apparatus. In the embodiment shown in FIG. 21 the aroma passage channel 2114 extends through the housing 2113 to above the at least one outflow opening 2115 of the apparatus. The aroma passage channel 2114 has an inlet port 2114A and an outlet port 2114B (see also FIG. 22), the surface area of which is equal to each other. As shown in FIG. 22 the outlet port 2114B is a slot substantially extending (during operation) in a horizontal plane. In the embodiment shown the aroma passage channel slopes downwardly with an angle of 13° with respect to a horizontal plane, but can in other embodiment slope down with an angle between 10° and 15°.

Figure 23:
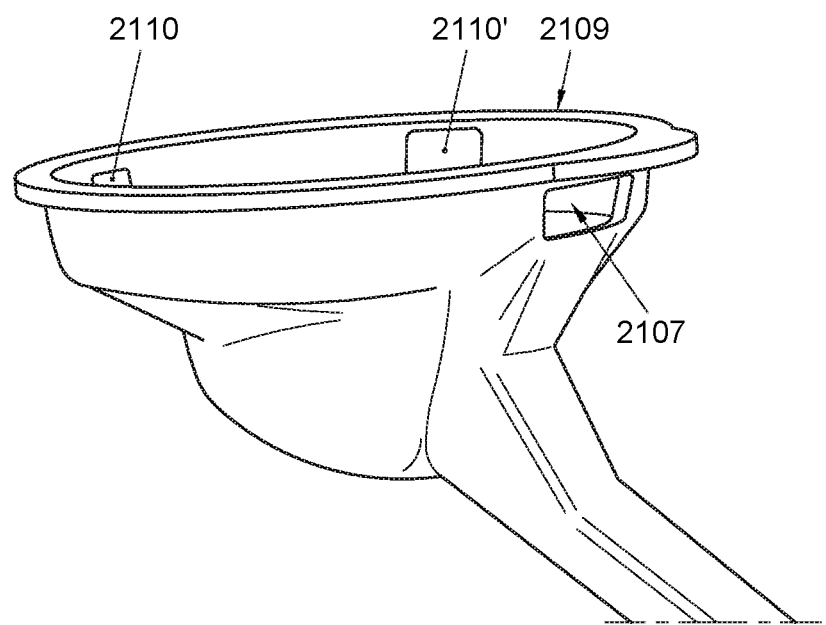
FIG. 23 schematically shows the coffee outlet chamber comprising the dispenser opening and the coffee outlet chamber air passage opening incorporated in the circumferential wall of the coffee outlet chamber.

Although in the embodiment of FIG. 21 the dispenser opening 2107 is provided in the circumferential wall at 180° from the coffee outlet chamber air passage opening 2110 (see also FIG. 23), it is in another embodiment also possible to provide an alternative coffee outlet chamber air passage opening 2110' in the circumferential wall at 90° from the dispenser opening 2107. In even further alternative embodiments the angle between the coffee outlet chamber air passage opening and the dispenser opening can take other values.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. An apparatus for preparing a coffee beverage, the apparatus comprising:
   a housing comprising an interior space and a beverage outflow opening;
   a holder arranged for receiving a coffee container, the holder comprising and an access opening for placing the coffee container in the holder, and an orifice for generating a coffee beverage flow;
   a heating device for heating water;
   a water supplying device comprising a liquid duct for supplying heated water from the heating device to the coffee container;
   a coffee outlet chamber at least partially defining a liquid coffee beverage flow path extending between the orifice of the holder and the beverage outflow opening of the apparatus, said coffee outlet chamber comprising a coffee beverage passage so that—in use—the coffee beverage flows through the coffee outlet chamber to the beverage outflow opening of the apparatus;
   an air flow generator for generating a flow of air in the coffee outlet chamber proximate the liquid coffee beverage flow path during operation for entraining a coffee beverage aroma in the flow of air;
   wherein said coffee outlet chamber comprises at least one aroma dispenser opening for dispensing the coffee beverage aroma in a direction away from the apparatus, wherein said at least one aroma dispenser opening is separate from the beverage outflow opening of the apparatus.

2. The apparatus for preparing a coffee beverage according to claim 1, wherein the orifice is arranged for generating a coffee beverage jet, wherein the holder comprises a foam chamber into which the orifice opens for receiving the jet generated by the orifice, said foam chamber having at least one discharging opening for dispensing the coffee beverage into the coffee outlet chamber and a jet impact element included in the foam chamber with a top which is clear of an inner wall of the foam chamber whereby the orifice and the jet impact element are oriented relative to each other such that the jet spouts against at least a part of the top of the jet impact element whereby the beverage, after impact on the jet impact element, leaves the foam chamber via the at least one discharging opening as the coffee beverage, said foam chamber being preferably further provided with at least one air supply opening for supplying air to the foam chamber.

3. The apparatus for preparing a coffee beverage according to claim 1, wherein in the interior space of the housing the heating device and the water supplying device and the liquid duct are positioned, said air flow generator being positioned for—during operation—generating a flow of air within the interior space which contacts heated parts of the apparatus within the interior space.

4. The apparatus for preparing a coffee beverage according to claim 1, wherein the air flow generator is arranged, preferably in or near a wall of the coffee outlet chamber, for—during operation—directly directing the flow of air in the coffee outlet chamber.

5. The apparatus according to claim 4, wherein the air flow generator is arranged for—during operation—blowing the flow of air into the coffee outlet chamber below the at least one orifice wherein optionally said coffee outlet chamber is positioned between the interior space and the air flow generator.

6. The apparatus for preparing a coffee beverage according to claim 1, wherein the circumferential wall of the coffee outlet chamber comprises a coffee outlet chamber air passage opening arranged for—during operation—communicating with the interior space for passing air from the interior space into the coffee outlet chamber.

7. The apparatus for preparing a coffee beverage according to claim 1, wherein the apparatus comprises a lid for closing and releasing the access opening, wherein the liquid duct is arranged for supplying heated water from the heating device to the lid, said lid being provided with an inflow opening for supplying heated water from the liquid duct to the coffee container, said lid comprising a lid air passage opening arranged for—during operation—communicating with the interior space for passing air from the interior space into the coffee outlet chamber via the coffee container wherein optionally the apparatus comprises an air warming unit positioned in the interior space, said air warming unit being arranged during operation for warming air within the interior space wherein said air warming unit being positioned near an air passage opening wherein optionally the air warming unit is arranged during operation for warming up air with a temperature value in a range between 20° C. and 140° C., preferably between 20° C. and 80° C.

8. The apparatus for preparing a coffee beverage according to claim 1, wherein the apparatus comprises an air moistener positioned in the interior space, said air moistener being arranged for—during operation—moistening the flow of air, preferably within the interior space.

9. The apparatus for preparing a coffee beverage according to claim 7, wherein the apparatus comprises an air moistener positioned in the interior space, said air moistener being arranged during operation for moistening the flow of air, preferably within the interior space and wherein said air moistener is positioned near the lid air passage opening.

10. The apparatus for preparing a coffee beverage according to claim 6, wherein the apparatus comprises an air warming unit positioned in the interior space, said air warming unit being arranged during operation for warming air within the interior space wherein said air warming unit being positioned near an air passage opening wherein optionally the air warming unit is arranged during operation for warming up air with a temperature value in a range between 20° C. and 140° C. preferably between 20° C. and 80° C.

11. The apparatus for preparing a coffee beverage according to claim 1, wherein the apparatus comprises a control unit for controlling the functioning of the apparatus, said control unit being operatively connected to a user operated heating up button and operatively connected to the heating device for activating the heating device after a user has activated the user operated heating up button, said control unit being operatively connected to said air flow generator for controlling the air flow generator, wherein said control unit is operatively connected to a user operated aroma dispensing button for controlling the air flow generator after a user has activated the user operated aroma dispensing button.

12. The apparatus for preparing a coffee beverage according to claim 11, wherein the control unit is arranged for activating the air flow generator a predetermined time period after the user operated heating up button has been activated.

13. The apparatus for preparing a coffee beverage according to claim 11, wherein the coffee container is provided with means comprising readable id-information, said apparatus comprising a reader for reading the readable id-information on the coffee container, said reader being operatively connected to the control unit for providing a reading signal to the control unit, said reading signal being indicative for the read id-information, said control unit automatically controlling the air flow generator in dependence of the reading signal received from the reader.

14. The apparatus for preparing a coffee beverage according to claim 1, wherein the orifice is integral with the holder.

15. The apparatus for preparing a coffee beverage according to claim 2, wherein the foam chamber extends into the coffee outlet chamber.

16. The apparatus for preparing a coffee beverage according to claim 1, wherein the at least one outflow opening for discharging coffee beverage is formed by the free end of an outlet duct of the coffee outlet chamber having a bottom part over which—during operation—coffee beverage flows and a top part opposite the bottom part, said at least one dispenser opening being positioned in the top part.

17. The apparatus for preparing a coffee beverage according to claim 6, wherein said at least one dispenser opening is provided in the circumferential wall of the coffee outlet chamber, said at least one dispenser opening being separate from the coffee outlet chamber air passage opening, said apparatus comprising an aroma passage channel—during operation—communicating with the at least one dispenser opening for passing aroma from the coffee outlet chamber in a direction away from the apparatus.

18. The apparatus for preparing a coffee beverage according to claim 6, wherein the housing comprises a housing air passage opening which—during operation—lies adjacent and preferably in line with the coffee outlet chamber air passage opening so that air can pass both through the coffee outlet chamber air passage opening and the housing air passage opening.

19. The apparatus for preparing a coffee beverage according to claim 1, wherein the coffee outlet chamber is arranged for providing a flow surface with a large area for the coffee beverage, wherein the coffee outlet chamber comprises protrusions or a relief construction.

20. A system comprising an apparatus for preparing a coffee beverage according to claim 1 and at least one coffee container, wherein said at least one coffee container is configured to be placed in the holder via the access opening.

21. The system according to claim 20, wherein:
the coffee container comprises means comprising readable id-information, said apparatus comprising a reader for reading the readable id-information on the coffee container, said reader being operatively connected to the control unit for providing a reading signal to the control unit, said reading signal being indicative for the read id-information, said control unit automatically controlling the air flow generator in dependence of the reading signal received from the reader.
said at least one coffee container comprises a first coffee container provided with means comprising readable first id-information, wherein the reader is arranged for providing a first reading signal to the control unit, said first reading signal being indicative for the read first id-information, said control unit automatically activating the air flow generator in reaction to the first reading signal received from the reader.

22. The system according to claim 21, wherein said at least one coffee container further comprises a second coffee container either provided with means comprising readable second id-information or free of means comprising readable id-information, wherein the reader is arranged for providing a second reading signal to the control unit, said second reading signal being either indicative for the read second id-information or indicative for a second coffee container free of means comprising readable id-information, said control unit automatically deactivating or not activating the air flow generator in dependence of the second reading signal received from the reader.

23. The system according to claim 20, wherein the at least one coffee container is a capsule comprising a circumferential wall, a bottom closing the circumferential wall at a first end, and a lid closing the circumferential wall at a second end opposite the bottom, wherein the wall, bottom and lid enclose an inner space comprising an extractable coffee product, wherein the bottom comprises an entrance area arranged for supplying there through a fluid under pressure to the extractable coffee product for preparing the coffee beverage, wherein the lid comprises an exit area for draining there through the prepared beverage from the capsule, and wherein the entrance area of the capsule comprises an entrance filter for supplying the fluid to the extractable product there through.

24. The system according to claim 21, wherein the means comprising readable first id-information are formed by at least one of the following: optically readable symbols, such as a barcode or a color code or a taggant; magnetically responsive surfaces; embossed surfaces; electrically-responsive surfaces, such as an electrically conductive surface or structure; an integrated circuit, such as an RFID or NFC-chip.

25. A method for preparing a coffee beverage using an apparatus for preparing a coffee beverage according to claim 1, the method comprising the steps of:
positioning a coffee container in the holder;
heating water by the heating device;
supplying heated water to the coffee container; and
discharging coffee beverage from the orifice of the holder into the coffee outlet chamber;
generating a flow of air in the coffee outlet chamber for entraining in the flow of air an aroma of the coffee beverage; and
dispensing coffee beverage aroma in a direction away from the apparatus.

26. The method for preparing a coffee beverage according to claim 25, wherein the method comprises the step of generating a coffee beverage jet by the orifice, providing the holder with a foam chamber into which the orifice opens for receiving the jet generated by the orifice, said foam chamber having at least one discharging opening for dispensing the coffee beverage into the coffee outlet chamber and a jet impact element included in the foam chamber with a top which is clear of an inner wall of the foam chamber whereby the orifice and the jet impact element are oriented relative to each other such that the jet spouts against at least a part of the top of the jet impact element whereby the beverage, after impact on the jet impact element, leaves the foam chamber via the at least one discharging opening as the coffee beverage, said foam chamber being preferably further provided with at least one air supply opening for supplying air to the foam chamber.

27. The method for preparing a coffee beverage according to claim 25, wherein the step of generating a flow of air comprises the step of generating a flow of air within an interior space of a housing of the apparatus, in which housing the heating device and the water supplying device are positioned, and the step of heating the flow of air within the interior space, preferably warming up air with a temperature value in a range between 20° C. and 140° C., preferably between 20° C. and 80° C.

28. The method for preparing a coffee beverage according to claim 25, wherein the step of generating a flow of air comprises the step of passing air into the coffee outlet chamber via the coffee container.

29. The method for preparing a coffee beverage according to claim 25, wherein the method comprises the step of moistening the flow of air, preferably within an interior space of a housing of the apparatus, in which housing the heating device and the water supplying device are positioned.

30. The method for preparing a coffee beverage according to claim 25, wherein said at least one dispenser opening is provided in a circumferential wall of the coffee outlet chamber, said at least one dispenser opening being seperate from the coffee outlet chamber air passage opening, said apparatus comprising an aroma passage channel communicating during operation with the at least one dispenser opening for passing aroma from the coffee outlet chamber in a direction away from the apparatus, wherein the step of dispensing coffee beverage aroma in a direction away from the apparatus, is performed through the at least one dispenser opening positioned in the circumferential wall of the coffee outlet chamber and the aroma passage channel.

31. The method for preparing a coffee beverage according to claim 25, wherein the control unit is operatively connected to a user operated brewing button and operatively connected to the water supplying device for supplying water via the liquid duct after a user has activated the user operated brewing button, wherein a user operated aroma dispensing buttom is formed by the user operated brewing button, wherein the method comprises the step of activating the air flow generator when the user operated brewing button is activated.

32. The method for preparing a coffee beverage according to claim 25, wherein the coffee container is provided with means comprising readable id-information, said apparatus comprising a reader for reading the readable id-information on the coffee container, said reader being operatively connected to the control unit for providing a reading signal to the control unit, said reading signal being indicative for the read id-information, said control unit automatically controlling the air flow generator in dependence of the reading signal received from the reader, and wherein said method further comprises the steps of reading the means comprising readable id-information of the coffee container by the reader, providing a reading signal indicative for the read id-information to the control unit, and the step of said control unit automatically controlling the air flow generator in dependence of the reading signal received from the reader.

33. The method for preparing a coffee beverage according to claim 32, wherein said control unit is arranged for automatically controlling the air flow generator in one of the following manners: activating the air flow generator, de-activating the air flow generator, not-activating the air flow generator and activating the air flow generator such as to generate a flow with an amount in dependence of the reading signal received from the reader.

\* \* \* \* \*